US012807121B2

(12) United States Patent
Dijken et al.

(10) Patent No.: US 12,807,121 B2
(45) Date of Patent: Nov. 24, 2026

(54) METHOD FOR DIAGNOSING AN ELECTRONIC VEHICLE BRAKE SYSTEM, COMPUTER PROGRAM THEREFOR AND VEHICLE WITH BRAKE DIAGNOSTICS

(71) Applicant: Lightyear IPCo B.V., Helmond (NL)

(72) Inventors: Durandus Kornelius Dijken, Eindhoven (NL); Jaap Van De Vorst, Nijmegen (NL); Sathish Ramachandran, Helmond (NL)

(73) Assignee: Lightyear IPCo B.V., Helmond (NL)

( * ) Notice: Subject to any disclaimer, the term of this patent is extended or adjusted under 35 U.S.C. 154(b) by 364 days.

(21) Appl. No.: 18/711,831

(22) PCT Filed: Nov. 25, 2022

(86) PCT No.: PCT/EP2022/083225
§ 371 (c)(1),
(2) Date: May 20, 2024

(87) PCT Pub. No.: WO2023/099342
PCT Pub. Date: Jun. 8, 2023

(65) Prior Publication Data

US 2025/0010839 A1 Jan. 9, 2025

(30) Foreign Application Priority Data

Nov. 30, 2021 (NL) ..................................... 2029963

(51) Int. Cl.
*B60T 17/22* (2006.01)
*B60T 7/04* (2006.01)

(52) U.S. Cl.
CPC ............ *B60T 17/221* (2013.01); *B60T 7/042* (2013.01); *B60T 2270/406* (2013.01)

(58) Field of Classification Search
CPC .................................................... B60T 17/221
(Continued)

(56) References Cited

U.S. PATENT DOCUMENTS

2012/0118681 A1 5/2012 Cho
2014/0326549 A1 11/2014 No
(Continued)

FOREIGN PATENT DOCUMENTS

EP 3888983 A1 10/2021

OTHER PUBLICATIONS

Netherlands Search Report and Written Opinion dated Mar. 12, 2022, for Netherlands Application No. 20299663.
(Continued)

*Primary Examiner* — Walter L Lindsay, Jr.
*Assistant Examiner* — Philip T Fadul
(74) *Attorney, Agent, or Firm* — Patterson + Sheridan, LLP

(57) ABSTRACT

The invention pertains to a method for diagnosing an electronic vehicle brake system, a vehicle comprising such an electronic vehicle brake system, a controller configured to for diagnose an electronic vehicle brake system and a computer program for diagnosing an electronic vehicle brake system. The method comprises the steps of generating a test current value and an expected brake effect value, instructing a brake power source of the electronic brake system to supply a test current to an electric brake motor of the electronic brake system, receiving a brake effect measurement value from a sensor of the vehicle, and obtaining a diagnostic result by comparing the brake effect measurement value with the expected brake effect value. Optionally, the brake effect comprises an increase in power supplied from a wheel motor power source to an electric wheel motor, such as an in-wheel motor, of the vehicle.

21 Claims, 7 Drawing Sheets

Figure 1:
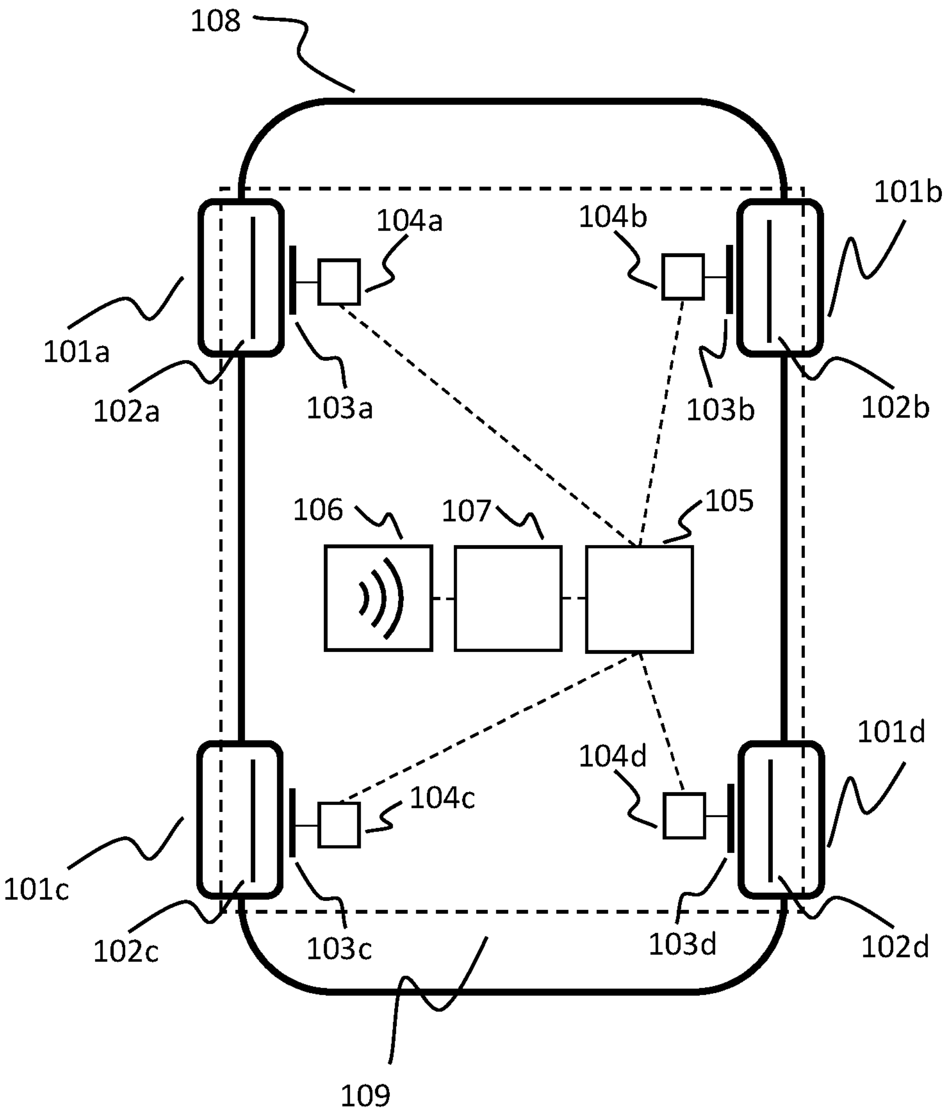

(58) Field of Classification Search
USPC .......................................................... 73/121
See application file for complete search history.

(56) References Cited

U.S. PATENT DOCUMENTS

| | | | |
|---|---|---|---|
| 2018/0056961 A1 | 3/2018 | Krueger et al. | |
| 2018/0056964 A1 | 3/2018 | Pennala et al. | |
| 2022/0073039 A1* | 3/2022 | Putz ..................... | B60T 13/662 |

OTHER PUBLICATIONS

PCT International Search Report and Written Opinion dated Mar. 20, 2023, for International Application No. PCT/EP2022/083225.

* cited by examiner

METHOD FOR DIAGNOSING AN ELECTRONIC VEHICLE BRAKE SYSTEM, COMPUTER PROGRAM THEREFOR AND VEHICLE WITH BRAKE DIAGNOSTICS

The invention pertains to a method for diagnosing an electronic vehicle brake system, a vehicle comprising such an electronic vehicle brake system and a controller configured to perform the steps of the method for diagnosing said electronic vehicle brake system, and a computer program for diagnosing an electronic vehicle brake system.

A common type of brake system for wheels of a vehicle comprises a brake disc which rotates along with the wheel, and a brake pad which is forced against the brake disc during a brake action. The forcing of the brake pad against the brake disc causes friction between the brake pad and the brake disc, and therewith a brake force is generated which slows down the wheel with which the brake disc is associated.

In an electronic brake system, the brake pad is driven towards the brake disc during a brake action and retracted from the brake disc after a brake action by an electric brake motor. The electric brake motor is for example mechanically connected to the brake pad with a spindle/ball screw, which spindle/ball screw is rotatably driven by the motor, resulting in a linear motion of the brake pad towards or away from the brake disc. To drive the electric brake motor, the electric brake motor is supplied with electric current from a brake power source, typically from a battery of the vehicle.

A brake action is the result of a brake action request, which brake action request is for example performed by the driver of the vehicle when the driver presses a brake pedal of the vehicle. For another example, the brake action request is performed by an automated system of the vehicle. The electronic brake system converts a requested brake force to a suitable electric current value, and then requests an electric current with a magnitude equal to the computer electric current value to be supplied from the brake power source to the electric brake motor. The computed electric current value is thus proportional to the requested brake force of the brake action. In certain cases, however, the effect of the brake action, i.e., the actual deceleration of the vehicle, is different from the expected effect of the brake action, i.e., the expected deceleration of the vehicle. This can for example be the case due to wear and tear of components of the electronic brake system, such as the brake pad, the spindle, the electric brake motor, etc. Such malfunctioning of the brake system can lead to dangerous situations if the generated brake force is diminished to a point where the vehicle cannot stop in a sufficiently short time. If the vehicle comprises multiple wheels, each wheel being associated with a brake, when one brake is not functioning, the vehicle is susceptible to be pulled in one direction during braking. It is thus of paramount importance that such malfunctioning is detected before any unsafe situations arise.

Many diagnostic methods and systems for detecting whether a brake system of a vehicle is functioning correctly have been proposed in the art. For example, when a vehicle is standing still, the brake is actuated and a resulting force generated by the interaction of a brake pad and an associated brake disc is measured and compared to an expected brake force. However, such methods do not measure the effect of the brake action while the vehicle is driving. As a result, existing methods are unable to precisely determine whether the effect of the brake action corresponds to an expected effect of the brake action.

The invention aims to provide an improved method for diagnosing an electronic brake system of a vehicle.

This object of the invention is achieved by a method for diagnosing an electronic brake system of a vehicle while at least one wheel of the vehicle is being driven, the method comprising the following steps:

- generating a test current value and an expected brake effect value, the expected brake effect value being deduced from the test current value based on characteristics of the vehicle;
- instructing a brake power source of the electronic brake system, which brake power source is configured to drive an electric brake motor of the electronic brake system, to supply a test current to the electric brake motor of the electronic brake system, the magnitude of the test current being equal to the test current value;
- receiving a brake effect measurement value from a sensor of the vehicle, the brake effect measurement value representing an effect on the vehicle as a result of a brake force generated by the interaction of a brake disc and a brake pad of the electronic brake system, the interaction of the brake disc and the brake pad being the result of the brake pad being pressed against the brake disc by the electric brake motor of the electronic brake system, the brake disc being associated to a wheel of the vehicle;
- obtaining a diagnostic result by comparing the brake effect measurement value with the expected brake effect value.

The method according to the invention is performed for diagnosing an electronic brake system of a vehicle. The vehicle comprises at least one wheel. For example, the vehicle comprises two wheels, or four wheels, or eight wheels. The method is performed while at least one wheel of the vehicle is being driven by a motor. For example, the at least one wheel is being driven by a central motor of the vehicle. The central motor is for example a combustion engine, which is driven by the combustion of a fuel, or an electrical motor, driven by the supply of electrical current from an electric power source such as a battery. In another example, the wheel is driven by an electric in-wheel motor. The in-wheel motor directly drives an associated wheel and is driven by the supply of electrical current from an electric power source such as a battery. The driving of the wheel results in a rotation of the wheel and therewith, if the vehicle is located on a surface, for example a road, the vehicle is propelled over that surface with a velocity. The vehicle can also remain stationary while the wheel is rotating, for example in case the vehicle is being serviced and is located on a test bed with rollers for the wheels of the vehicle, or is suspended in the air by a lifting device which does not engage the wheels of the vehicle.

The electronic brake system of the vehicle comprises a brake pad and a brake disc. The brake disc is typically mechanically attached to a respective wheel of the vehicle and therewith follows the rotation of the associated wheel of the vehicle. The brake pad is typically held in a brake caliper, the brake caliper being arranged such that the brake pad is located at a distance from the brake disc if no brake action is performed. The electronic brake system further comprises an electric brake motor and an electric brake power source. When a brake action is performed, a current is supplied from the electric brake power source to the electric brake motor, therewith driving the electric brake motor. The electric brake motor is further mechanically connected to a brake actuator, such as a spindle and/or a piston. The electric brake motor drives the brake actuator to move the brake pad, such that the brake pad moves towards the brake disc and comes into contact with the brake disc.

The interaction between the brake pad and the brake disc generates a frictional force. This frictional force slows down the rotational or angular velocity of the wheel. Therewith, when the vehicle is being driven on a surface, the vehicle is slowed down, i.e., the vehicle's velocity is reduced.

To diagnose whether the electronic brake system of the vehicle is working properly, first, a test current value is generated. The test current value is a relatively small value, for example 0.1 A, 0.2 A, 0.3 A, 1 A, or 5 A. Then, based on the test current value, an expected brake effect value is generated. The expected brake effect value represents a desired effect of a brake action on the vehicle. The expected brake effect value for example represents an expected reduction in the velocity of the vehicle, and/or an expected reduction in the angular velocity of the wheel. Alternatively, the brake effect value represents an increase in the power generated by the motor of the vehicle to keep the velocity of the vehicle and/or the angular velocity of the wheel constant. In case of an electric motor, the increase in power generated by the electric motor is the result of an increase in current supplied to the electric motor by a power source. In the case that each wheel of the vehicle is driven by an in-wheel motor, the expected brake effect is an increase in the power supplied to the in-wheel motor of the wheel associated with the electric brake motor to which the test current is supplied. The expected brake effect value is proportional to the test current value. For example, the expected brake effect value is obtained by consulting a look-up table, whereby the look-up table explicitly encodes the relationship between current values and brake effects.

Then, the brake power source of the electronic brake system is instructed to supply a test current to an electric brake motor of the electronic brake system. The brake power source is for example a battery of the vehicle. For example, the vehicle has a central battery used to power the electrical components of the vehicle, including the electronic brake system. Alternatively, the electronic brake system has a dedicated power source, such as a dedicated battery. In another example, the brake power source is a fuel cell. The magnitude of the test current is equal to the test current value. For example, if the test current value is 0.1 A, a test current of 0.1 A is supplied from the brake power source to the electric brake motor. By supplying the test current to the electric brake motor, the electric brake motor is driven with a speed and/or force proportional to the test current. Therewith, the brake actuator is driven by the electric brake motor, which presses the brake pad against the brake disc.

Then, a brake effect measurement value is obtained from a sensor of the vehicle. The brake effect measurement value representing an effect on the vehicle as a result of a brake force generated by the interaction of a brake disc and a brake pad of the electronic brake system. The brake effect measurement value for example represents a reduction in the velocity of the vehicle. Alternatively or additionally, the brake effect measurement value represents a reduction in the angular velocity of a wheel of the vehicle. Alternatively or additionally, the brake effect measurement value represents an increase in the current and/or voltage and/or power supplied to a central motor of the vehicle and/or an in-wheel motor of the vehicle. For example, the sensor is a velocity sensor for measuring the velocity at which the vehicle is being driven on a surface. For another example, the sensor is an acceleration sensor for measuring the rate of deceleration and/or acceleration of the vehicle. For another example, the sensor is a power sensor for measuring the voltage and/or current and/or power being supplied to an in-wheel motor or the central motor of the vehicle. For another example, the sensor is an angular velocity sensor for measuring the angular rotation of the wheel, for example a tachometer.

Then, the obtained brake effect measurement value is compared to the expected brake effect value. The expected brake effect value, for example, represents an "ideal" effect of the brake action that is the result of supplying the test current to the electric brake motor. The obtained brake effect measurement value then represents the "actual" effect of said brake action. In most cases, these values will differ, as the brake system suffers from wear and tear that may degrade its effectiveness as compared to an "ideal" standard effectiveness. The comparison of the brake effect measurement value with the expected brake effect value results in a diagnostic result. The diagnostic result thus comprises the difference between the "ideal" effect of the brake action and the "actual" effect of the brake action.

In an embodiment, the diagnostic result is or comprises a percentage of the "ideal" brake performance of the electric brake that performed the brake action. The percentage represents the ratio between the brake effect measurement value and the expected brake effect value. For example, the performance of the electric brake is 70% of the expected performance of the electric brake. This means that the brake effect measurement value is equal to 0.7 times the expected brake effect value.

In an embodiment, the diagnostic result is communicated to the operator of the vehicle. For example, if the diagnostic result is above a first threshold value, a warning is issued to the operator. The warning indicates that the vehicle needs servicing. In the example, if the diagnostic result is above a second threshold value, an error is issued to the operator. The error indicates a serious problem with the brake system of the vehicle, and indicates to the operator that the vehicle cannot be driven anymore. For example, if the first threshold is 85% of the expected performance, a warning is issued to the driver if the performance of the electric brake is below 85%. If the second threshold is 70%, an error is issued to the driver if the performance of the electric brake is below 70%.

Herewith, the method provides for a comparison of an actual effect of a brake action as the result of providing a test current to an electric brake motor of an electronic brake system and a desired effect of that brake effect. By performing the method while the wheel of the vehicle is being driven, an accurate diagnostic result is obtained by relying on sensors that measure the effect of the brake action.

In an embodiment, the instructions of the method are performed by a controller of the vehicle. To receive the brake effect measurement value, the controller receives an electronic signal on one of its input ports from a sensor. To instruct the brake power source of the electronic brake system, the controller transmits an electronic signal to said brake power source.

In an embodiment, the method further comprises the following two steps:

- before the step of instructing the brake power source of the electronic brake system to supply the test current to the electric brake motor of the electronic brake system, receiving a velocity measurement value from a velocity sensor, the velocity sensor being configured to measure a velocity of the vehicle and/or an angular velocity of the wheel, the wheel being driven by an electric wheel motor, the electric wheel motor being driven by a wheel motor power source;
- after instructing the brake power source of the electronic brake system to supply the test current to the electric brake motor of the electronic brake system, instructing the wheel motor power source to increase power supplied to the electric wheel motor such that the velocity of the vehicle and/or the angular velocity of the wheel remains equal to the velocity measurement value.

In this embodiment, the wheel of the vehicle is being driven by an electric wheel motor. For example, the electric wheel motor is a central electric motor of the vehicle, which central electric motor is configured to drive all wheels of the vehicle. In another example, the electric wheel motor is an in-wheel motor associated to the wheel of the vehicle. In this example, each wheel has an associated dedicated in-wheel motor that powers said wheel.

To offset the "actual" brake effect of the brake action that is the result of supplying the test current from the brake power source to the electric brake motor, said effect needs to be compensated. This is desirable, in particular when the vehicle is being driven on a surface. The operator of the vehicle is ideally unaware of the diagnostic method being performed. Thus, the velocity of the vehicle during the test procedure is preferably constant. The compensation of the brake effect can for example be achieved by an increase in the power supplied to the motor driving the wheel of the vehicle whose angular velocity is reduced by the brake action.

So, before the step of instructing the brake power source of the electronic brake system to supply the test current to the electric brake motor of the electronic brake system, a velocity measurement is obtained from a sensor of the vehicle. For example, the sensor is a velocity sensor for measuring the velocity at which the vehicle is being driven on a surface. For another example, the sensor is an acceleration sensor for measuring the rate of deceleration and/or acceleration of the vehicle. For another example, the sensor is an angular velocity sensor for measuring the angular rotation of the wheel, for example a tachometer. Optionally, the velocity measurement is obtained continuously over a time period with a particular frequency, for example every 0.1 s, or every 0.5 s, or every second.

Then, after the step of instructing the brake power source of the electronic brake system to supply the test current to the electric brake motor of the electronic brake system, the wheel motor power source is instructed to increase the power supplied to the electric wheel motor such that the velocity of the vehicle and/or the angular velocity of the wheel remains equal to the velocity measurement value. As a result of the increase in power supplied to the electric wheel motor, the velocity of the vehicle and/or the angular velocity of the wheel remains substantially equal to the measurement value obtained before the electric brake motor is supplied with the test current. In this way, the diagnostic method is not or minimally noticeable by an operator of the vehicle. Optionally, the power supplied to the electric wheel motor is adjusted continuously over a time period after each time a velocity measurement is obtained with a particular frequency.

In a variant of this embodiment, the brake effect measurement value is received from a power sensor, wherein the power sensor is configured to measure the increase in power supplied from the wheel motor power source to the electric wheel motor.

Thus, the brake effect is characterized by the increase in power supplied from the wheel motor power source to the electric wheel motor. Thus, the expected brake effect value generated by the method is an expected increase in the power to be supplied to the electric wheel motor such that the velocity of the vehicle and/or the angular velocity of the wheel remains equal to the velocity measurement value. The "actual" brake effect, i.e., the brake effect represented by the brake effect measurement value from the sensor of the vehicle, represents the actual increase in the power to be supplied to the electric wheel motor such that the velocity of the vehicle and/or the angular velocity of the wheel remains equal to the velocity measurement value. The sensor is for example a voltage sensor, or a current sensor, or a power sensor. The sensor is arranged such that it can detect the power supplied to the electric wheel motor. For example, a measurement of the sensor before the brake motor of the electronic brake system is supplied with the test current is compared to a measurement of the sensor after the brake motor of the electronic brake system is supplied with the test current to obtain the brake effect measurement.

Thus, the brake effect measurement value is obtained by assessing the compensation necessary to offset the brake effect. There is thus a symmetry between the expected brake effect and the expected increase in power to be supplied to the electric wheel motor such that the velocity of the vehicle and/or the angular velocity of the wheel remains equal to the velocity measurement value. Therefore, no additional sensors are required to measure the brake effect. The number of components and thus the complexity of the solution is minimized.

In an embodiment, the method is performed when the vehicle and/or the at least one wheel of the vehicle is being driven at a constant velocity and/or at a constant speed.

In this embodiment, the method steps are only performed when the vehicle and/or the at least one wheel of the vehicle is being driven at a constant velocity and/or at a constant speed. For example, the velocity and/or the speed of the vehicle and/or the at least one wheel of the vehicle is measured and/or monitored by an appropriate sensor over a predefined time period. The appropriate sensor is for example a velocity sensor or a speedometer or an accelerometer or an angular rate sensor.

In this embodiment the reliability of the determination of the brake effect and the expected brake effect is increased. If the vehicle is travelling at a constant velocity and/or speed, the effect of the brake action on the vehicle is more easily predicted compared to if the vehicle is travelling at a variable velocity and/or speed. In the case that the method includes the step of increasing the power supplied to the wheel motor of the vehicle, this embodiment reduces the disruption on the vehicle caused by the diagnostic method. As expected by a driver of the vehicle, the vehicle continues driving at the constant velocity and/or speed.

In a variant of this embodiment, the method is only performed when the vehicle and/or the at least one wheel of the vehicle is being driven at a constant velocity and/or at a constant speed. When the vehicle and/or the at least one wheel of the vehicle is being driven at a variable velocity and/or at a variable speed, the method is not performed.

In a variant of this embodiment, it is determined that the vehicle and/or the at least one wheel of the vehicle is being driven at a constant velocity if the vehicle and/or the at least one wheel of the vehicle is being driven at a constant velocity over a predefined time period. For example, the predefined time period is 1 s or 5 s or 10 s.

In a variant of this embodiment, the constant velocity and/or the constant speed of the vehicle and/or the at least one wheel is maintained by an automated system.

For example, the automated system is a cruise control system. The automated system regulates the amount of power generated by the engine of the vehicle. For example, the engine is a central engine that powers all wheels of the vehicle. For another example, the engine comprise multiple distributed engines, each engine powering a subset of the wheels of the vehicle. For another example, the engine is an in-wheel engine of a wheel of the vehicle. In this example, each wheel is driven by an associated in-wheel engine. For example, the engine is an electrical engine. The automated system is for example fully electronic, i.e., it regulates the power generated by the engine by using a "drive-by-wire" system. In this example, the automated system is implemented as a control algorithm and is deployed on a control unit of the vehicle. The control unit communicates with the engine, for example through signals sent from an output port of the control unit to an input port of the engine.

In one variant of this embodiment, the automated system is turned off by the diagnostic method. This results in a deceleration of the vehicle and/or the wheel of the vehicle. The brake effect is said deceleration of the vehicle. Said deceleration is measured by an appropriate sensor, for example a velocity sensor or a speedometer or an accelerometer or an angular rate sensor.

In another variant of this embodiment, the automated system is not turned off by the diagnostic method. Therewith, the constant velocity and/or the constant speed of the vehicle and/or the at least one wheel continues to be maintained by the automated system during the performing of the diagnostic method. This results in an increase in power generated by the engine of the vehicle to drive the wheels of the vehicle. The brake effect is said increase in power generated by the engine. Said increase in power is measured by an appropriate sensor, for example a power sensor. In case the engine is an electrical engine, the brake effect is the increase in electrical power drawn by the engine to achieve the increase in power generated by the engine. Said increase in electrical power is measured by an appropriate sensor, for example a power sensor or a voltage sensor or a current sensor.

In an embodiment, the method further comprises the following steps, which are carried out after generating the test current value and the expected brake effect value:

- receiving a force value representing a force with which a driver of the vehicle presses a brake pedal of the vehicle continuously over a predefined time period;
- supplying the test current to the brake power source of the brake system only when the force value remains constant over the predefined time period.

In this embodiment, the driver is performing a brake action by pressing the brake pedal of the vehicle. The driver presses the brake pedal with a force. Said force is measured by an appropriate sensor. For example, the appropriate sensor is a force transducer, for example a load cell, for example a strain gauge or a piezoelectric element. The force value received from the sensor represents the force with which a driver of the vehicle presses a brake pedal of the vehicle. The measurement by the sensor is performed over a predefined time period, for example 1s or 5 s or 10 s.

In this embodiment, the test current is only supplied to the brake power source if the force value measured by the sensor remains constant over the predefined time period. by supplying the test current to the brake power source in this case, the test current is added to the current being supplied to the brake power source by the brake action of the driver. For example, the force with which the driver is pressing the brake pedal is translated to a current, for example 0.1 A or 1 A or 5 A. For example, the test current is 0.1 A. The combined current supplied to the brake power source in the example is then 0.2 A, 1.1 A, and 5.1 A, respectively.

In this embodiment, the reliability of the determination of the brake effect and the expected brake effect is increased. If the driver presses the brake pedal of the vehicle continuously over a predefined time period, the vehicle decelerates with a constant rate over said predefined time period. Therewith, the effect of the brake action on the vehicle is more easily predicted compared to when the vehicle decelerates with a variable rate over said predefined time period.

In a variant of this embodiment, the constant value is 0.

In this variant, the driver is not braking, since the force with which the brake pedal of the vehicle is being pressed is 0 N. In this variant, the reliability of the determination of the brake effect and the expected brake effect is further increased.

In an embodiment, in the step of instructing the brake power source of the electronic brake system to supply the test current to the electric brake motor of the electronic brake system, the brake power source is instructed to provide the test current to the electric brake motor of the electronic brake system continuously over a test time period.

The test time period is for example 0.1 s, or 0.5 s, or 1 s, or 5 s. During the test time period, the test current is continuously provided to the electric brake motor. Thus, the brake effect occurs continuously during the test time period. In this case, the brake effect measurement value represents the continuous effect on the vehicle during the test time period. For example, the brake effect is a continuous deceleration of the vehicle during the test time period. For another example, the brake effect is a continuous increase of the power supplied to the engine of the vehicle such that the velocity of the vehicle and/or the angular velocity of the wheel remains constant over the test time period.

In a variant of this embodiment, the test current value is constant over the test time period. For example the test current value is 0.1 A or 0.2 A or 0.3 A or 1 A or 5 A.

In another variant of this embodiment, the test current value is variable over the test time period. For example, the test current value is a continuous function. For example, the test current value is a sine wave or a cosine wave.

In an embodiment, the electronic brake system comprises a plurality of electric brake motors and one or more sensors which is/are present in a vehicle comprising a plurality of wheels, each electric brake motor being associated with a respective wheel of the vehicle.

For example, the vehicle has 2 wheels or 4 wheels or 8 wheels. Each wheel is associated with a respective brake disc and a respective electronic brake. Each electronic brake comprises an electric brake motor and a brake pad. When a brake action is performed, a current is supplied from the electric brake power source to the electric brake motor, therewith driving the electric brake motor. Each electric brake motor is further mechanically connected to a brake actuator, such as a spindle and/or a piston. The electric brake motor drives the brake actuator to move the brake pad, such that the brake pad moves towards the brake disc and comes into contact with the brake disc. The interaction between the brake pad and the brake disc generates a frictional force. This frictional force slows down the rotational or angular velocity of the wheel. The electronic brakes of the vehicle are, for example, centrally controlled. Therewith, each electric brake is actuated with the same force when a brake action is performed. In another example, the electronic brakes of the vehicle are individually controlled. Each electronic brake can be actuated with a different brake force when a brake action is performed.

In the step of generating the test current value and the expected brake effect value, a test current value and an expected brake effect value for one or more of the electric brake motors of the electronic brake system is generated. For one example, exactly one test current value is generated. For another example, a respective test current value and an expected brake effect value are generated for each of the one or more electric brake motors. In one variant, all generated test current values are identical. In another variant, the generated test current values are different. In one example, exactly one expected brake effect value is generated. For example, the expected brake effect value is the total deceleration of the vehicle when the electric brake motors are actuated with their respective test current values. In another example, an expected brake effect value is generated for each of the one or more electric brake motors.

For example, the expected brake effect value is the deceleration of the vehicle when one electric brake motor is actuated with a respective test current value. For another example, the expected brake effect value is the deceleration of the rotational velocity of the wheel associated to the electric brake motor that is actuated with a respective test current value.

In the step of instructing the brake power source of the electronic brake system to supply a test current to the electric brake motor of the electronic brake system, the brake power source of the electronic brake system is instructed to supply a test current to a respective electric brake motor of the electronic brake system, the test current being equal to a respective test current value. For example, a test current equal to a single test current value is supplied to all electric brake motors of the electronic brake systems. For another example, test currents equal to different test current values are supplied to respective electric brake motors. For yet another example, a test current equal to one test current value is supplied to one or more electric brake motors, and a test current equal to a second test current value is supplied to the remaining electric brake motors.

In the step of receiving the brake effect measurement value from the sensor of the electronic brake system, one or more brake effect measurement values from one or more sensors of the vehicle is received, each brake effect measurement value of the one or more brake effect measurement values representing an effect on the vehicle as a result of a brake force generated by the interaction of a respective brake disc and a respective brake pad of the electronic brake system, the interaction of the respective brake disc and the respective brake pad being the result of the respective brake pad being pressed against the respective brake disc by the respective electric brake motor of the electronic brake system. For example, a single brake effect measurement value is received from a single sensor. For example, the sensor is a speedometer or an accelerometer that is configured to measure the speed and/or acceleration of the vehicle. The brake effect in this case is a reduction in the speed and/or acceleration of the vehicle. For another example, the vehicle comprises a sensor for each of the wheels of the vehicle. For example, the sensor is configured to measure the angular rotation of a respective wheel. The brake effect in this case is a reduction in the angular velocity of the respective wheel as a result of the supplying of the test current to a respective electric brake motor.

In the step of obtaining the diagnostic result, the diagnostic result is obtained by comparing each brake effect measurement value with a respective expected brake effect value. The diagnostic result thus aggregates the comparisons of the brake effect measurement values with their respective expected brake effect values. For example, the diagnostic result is a comparison of the expected deceleration of the vehicle with the measured deceleration of the vehicle for each of the actuations of a respective brake motor by supplying a respective test current value. For another example, the diagnostic result is a comparison of the expected deceleration in angular rotation of a respective wheel for each of the actuations of a respective brake motor by supplying a respective test current value.

Optionally, in a variant of this embodiment, each wheel of the vehicle is being driven by an electric wheel motor. For example, the electric wheel motor is a central electric motor of the vehicle, which central electric motor is configured to drive all wheels of the vehicle. In another example, the electric wheel motor is an in-wheel motor associated to a respective wheel of the vehicle. In this example, each wheel has an associated dedicated in-wheel motor that powers said wheel.

To offset the "actual" brake effect of the brake action that is the result of supplying the test current from the brake power source to the electric brake motor, said effect needs to be compensated. This is desirable, in particular when the vehicle is driving on a surface. The operator of the vehicle is ideally unaware of the diagnostic method being performed. Thus, the velocity of the vehicle during the test procedure is preferably constant. The compensation of the brake effect can for example be achieved by an increase in the power supplied to those motors driving the wheels of the vehicle whose angular velocity is reduced by the brake action.

So, before the step of instructing the brake power source of the electronic brake system to supply the test current to the electric brake motor of the electronic brake system, a velocity measurement is obtained from a sensor of the vehicle. For example, the sensor is a velocity sensor for measuring the velocity at which the vehicle is being driven on a surface. For another example, the sensor is an acceleration sensor for measuring the rate of deceleration and/or acceleration of the vehicle. For another example, the sensor is an angular velocity sensor for measuring the angular rotation of the wheel, for example a tachometer. Optionally, the velocity measurement is obtained continuously over a time period with a particular frequency, for example every 0.1 s, or every 0.5 s, or every second.

Then, after the step of instructing the brake power source of the electronic brake system to supply the test current to the electric brake motor of the electronic brake system, the wheel motor power source is instructed to increase the power supplied to the electric wheel motors such that the velocity of the vehicle and/or the angular velocity of the respective wheels remains equal to the velocity measurement value. As a result of the increase in power supplied to the one or more electric wheel motors, the velocity of the vehicle and/or the angular velocity of the wheels remains substantially equal to the measurement value obtained before the electric brake motor is supplied with the test current. In this way, the diagnostic method is not or minimally noticeable by an operator of the vehicle. Optionally, the power supplied to the one or more electric wheel motors is adjusted continuously over a time period after each time a velocity measurement is obtained with a particular frequency.

In a variant of this embodiment, in the step of generating the test current value and the expected brake effect value, two complementary test current values I1 and I2 are generated. For example, I1 is 0.1 A and I2 is 0.1 A. For another example, I1 is 0.1 A+0.1 A*sin(t) and I2 is 0.1 A−0.1 A*sin(t). For another example, I1 is 0.1 A+0.1 A*sin(t) and I2 is 0.1 A+0.1 A*sin(t). I1 and I2 are complementary, which means that they are chosen such that the brake effect of two or more brake actions compensate each other. This means that, in case the brakes are functioning correctly, the combined brake effect of the two or more brake actions result in a constant, smooth deceleration of the vehicle and/or the wheels. In case one brake is malfunctioning, the combined brake effect of the two or more brake actions result in a non-constant, fluctuating deceleration of the vehicle and/or the wheels. The two or more brake actions correspond to the application of a test current to two or more electric brake motors of the electronic brake system, wherein the test current is I1 or I2.

In the step of instructing the brake power source of the electronic brake system to supply a test current to the electric brake motor of the electronic brake system, the brake power source is instructed to supply a test current equal to the test current value I1 to an electric brake motor associated with a front wheel of the vehicle, and instructing the brake power source to supply a test current equal to the test current value I2 to an electric brake motor associated with a back wheel of the vehicle.

For example, for a vehicle having four wheels, a test current equal to the test current value I1 is applied to the electric brake motor associated with the front left wheel of the vehicle and a test current equal to the test current value I2 is applied to the electric brake motor associated with the back right wheel of the vehicle. For another example, a test current equal to the test current value I1 is applied to the electric brake motor associated with the front left wheel of the vehicle and a test current equal to the test current value I2 is applied to the electric brake motor associated with the back left wheel of the vehicle.

In an embodiment, the steps of the method are repeated at least two times, wherein a diagnostic result is obtained in each repetition of the method, resulting in a plurality of diagnostic results, and wherein the method further comprises a step of aggregating the plurality of diagnostic results to obtain an aggregated diagnostic result.

For example, the steps of the method are repeated for each wheel of the vehicle. For each wheel of the vehicle, a diagnostic result is obtained, which for example is a performance of the electric brake associated to the respective wheel. The aggregated diagnostic result comprises the performance of all the electric brakes of the vehicle. For another example, a single electronic brake is tested multiple times. The aggregated diagnostic result is an average of the individual diagnostic results.

In a variant of this embodiment, wherein in the step of instructing the brake power source of the electronic brake system to supply a test current to the electric brake motor of the electronic brake system, the brake power source is instructed to supply a test current equal to the test current value I1 to an electric brake motor associated with a front wheel of the vehicle, and instructing the brake power source to supply a test current equal to the test current value I2 to an electric brake motor associated with a back wheel of the vehicle, the steps of the method are repeated at least four times.

In each repetition of the step of instructing the brake power source of the electronic brake system to supply a test current to the electric brake motor of the electronic brake system, the brake power source is instructed to supply a test current equal to a respective test current value to the electric brake motors associated with a different pair of a front wheel and a rear wheel of the vehicle. For example, in a first repetition of the method, a test current is first supplied to the electric brake motor of the front left and back right wheels. In a second repetition of the method, a test current is supplied to the electric brake motor of the front right and back left wheels. In a third repetition of the method, a test current is supplied to the electric brake motor of the front left and back left wheels. In a fourth repetition of the method, a test current is supplied to the electric brake motor of the front right and back right wheels.

In each repetition of the step of receiving the brake effect measurement value from the sensor of the electronic brake system, a single brake effect measurement value representing the brake effect on the vehicle as a result of the combined brake force generated by the interaction of a brake disc and a brake pad of the electronic brake system associated with the front wheel and the interaction of a brake disc and a brake pad of the electronic brake system associated with the rear wheel is received.

In the step of aggregating the plurality of diagnostic results, an aggregated diagnostic result that represents a deduced braking quality of each pair of interacting brake disc and brake pad of the electronic brake system is obtained.

The invention further pertains to a computer program comprising instructions which, when the program is executed by a computer, cause the computer to carry out the method according to the invention. The computer program is for example implemented in software, the software deployed on an integrated controller chip in a vehicle. For another example, the computer program is implemented in hardware, for example using a Field-Programmable Gate Array (FPGA).

The invention further pertains to a vehicle. The vehicle comprises

- a wheel;
- a sensor;
- an electronic brake system, comprising:
  - a brake disc, the brake disc being associated with the wheel;
  - a brake drive comprising a brake pad and an electric brake motor;
  - a brake power source, wherein the brake power source is configured to drive the electric brake motor of the brake drive;
  - a controller;
- wherein:
- the brake pad is arranged to interact with the brake disc to generate a brake force as a result of the brake pad being pressed by the electric brake motor against the brake disc;
- the sensor is configured to measure an effect on the vehicle as a result of the brake force generated by the brake pad pressing against the brake disc;
- the controller is configured to perform the following steps while the wheel of the vehicle is being driven:
- generate a test current value and an expected brake effect value, the expected brake effect value being deduced from the test current value based on characteristics of the vehicle;
- instruct the brake power source of the brake drive to supply a test current to the electric brake motor of the brake drive, the magnitude of the test current being equal to the test current value;
- receive a brake effect measurement value from the sensor;
- compare the brake effect measurement value with the expected brake effect value to obtain a diagnostic result.

The vehicle comprises at least one wheel. For example, the vehicle comprises two wheels, or four wheels, or eight wheels. The method is performed while at least one wheel of the vehicle is being driven by a motor. For example, the at least one wheel is being driven by a central motor of the vehicle. The central motor is for example a combustion engine, which is driven by the combustion of a fuel, or an electrical motor, driven by the supply of electrical current from an electric power source such as a battery. In another example, the wheel is driven by an electric in-wheel motor. The in-wheel motor directly drives an associated wheel and is driven by the supply of electrical current from an electric power source such as a battery. The driving of the wheel results in a rotation of the wheel and therewith, if the vehicle is located on a surface, for example a road, the vehicle is propelled over that surface with a velocity. The vehicle can also remain stationary while the wheel is rotating, for example in case the vehicle is being serviced and is located on a test bed with rollers for the wheels of the vehicle, or is suspended in the air by a lifting device which does not engage the wheels of the vehicle.

The sensor is for example a velocity sensor for measuring the velocity at which the vehicle is being driven on a surface. For another example, the sensor is an acceleration sensor for measuring the rate of deceleration and/or acceleration of the vehicle. For another example, the sensor is a power sensor for measuring the voltage and/or current and/or power being supplied to an in-wheel motor or the central motor of the vehicle. For another example, the sensor is an angular velocity sensor for measuring the angular rotation of the wheel, for example a tachometer.

The electronic brake system of the vehicle comprises a brake disc and a brake drive comprising a brake pad and an electric brake motor. The brake disc is typically mechanically attached to a respective wheel of the vehicle and therewith follows the rotation of the associated wheel of the vehicle. The brake pad is typically held in a brake caliper, the brake caliper being arranged such that the brake pad is located at a distance from the brake disc if no brake action is performed. The vehicle further comprises an electric brake motor and an electric brake power source. When a brake action is performed, a current is supplied from the electric brake power source to the electric brake motor, therewith driving the electric brake motor. The electric brake motor is further mechanically connected to a brake actuator, such as a spindle and/or a piston. The electric brake motor drives the brake actuator to move the brake pad, such that the brake pad moves towards the brake disc and comes into contact with the brake disc. The interaction between the brake pad and the brake disc generates a frictional force. This frictional force slows down the rotational or angular velocity of the wheel. Therewith, when the vehicle is being driven on a surface, the vehicle is slowed down, i.e., the vehicle's velocity is reduced.

The brake power source is for example a battery of the vehicle. For example, the vehicle has a central battery used to power the electrical components of the vehicle, including the electronic brake system. Alternatively, the electronic brake system has a dedicated power source, such as a dedicated battery. In another example, the brake power source is a fuel cell.

The controller of the vehicle is configured to execute the method according to the invention.

In an embodiment, the vehicle further comprises:

a velocity sensor, the velocity sensor being configured to measure the velocity of the vehicle and/or the angular velocity of the wheel;

an electric wheel drive comprising an electric wheel motor and a wheel motor power source, wherein the wheel motor power source is configured to drive the electric wheel motor of the electric drive, and the electric wheel motor is configured to drive the wheel;

wherein:

the controller is further configured to perform the following steps:

before the step of instructing the brake power source of the brake drive to supply the test current to the electric brake motor of the brake drive, receive a velocity measurement value from the velocity sensor;

after the step of instructing the brake power source of the brake drive to supply the test current to the electric brake motor of the brake drive, instruct the wheel motor power source of the electric wheel drive to increase power supplied to the electric wheel motor such that the velocity of the vehicle and/or the angular velocity of the wheel remains equal to the velocity measurement value.

In a variant of this embodiment, the sensor is a power sensor configured to measure the increase in power supplied from the wheel motor power source to the electric wheel motor.

In an embodiment, the vehicle comprises a plurality of wheels and one or more sensors. The electronic brake system of the vehicle comprises:

a plurality of brake discs, each brake disc being associated with a wheel of the vehicle;

a plurality of brake drives, each brake drive comprising a brake pad and an electric brake motor, wherein the brake power source is configured to drive the electric brake motor of each brake drive, wherein:

the brake pad of each brake drive is arranged to interact with a respective brake disc to generate a brake force as a result of the brake pad of the respective brake drive being pressed by the respective electric brake motor of the respective brake drive against the respective brake disc;

each sensor is configured to measure an effect on the vehicle as a result of the brake force generated by the brake pad of a brake drive pressing against the brake disc of said brake drive;

the controller of the electronic brake system is further configured to:

in the step of generating the test current value and the expected brake effect value, generate a test current value and an expected brake effect value for one or more of the plurality of brake drives, each expected brake effect value being deduced from the test current value based on characteristics of the vehicle;

in the step of instructing the brake power source of the brake drive to supply a test current to the electric brake motor of the brake drive, instruct the brake power source of each of the one or more brake drives to supply a test current to the electric brake motor of the respective brake drive, the magnitude of the test current being equal to a respective test current value;

in the step of receiving the brake effect measurement value from the sensor of the electronic brake system, receive one or more brake effect measurement values, each brake effect measurement value being received from a sensor of the one or more sensors;

in the step of obtaining the diagnostic result, compare each brake effect measurement value of the plurality of brake effect measurement values with a respective expected brake effect value to obtain the diagnostic result.

In a variant of this embodiment, the controller is further configured to:

in the step of generating the test current value and the expected brake effect value, generate two complementary test current values I1 and I2;

in the step of instructing the brake power source of the electronic brake system to supply a test current to the electric brake motor of the electronic brake system, instructing the brake power source to supply a test current equal to the test current value I1 to an electric brake motor of a brake drive associated with a front wheel of the vehicle, and instructing the brake power source to supply a test current equal to the test current value I2 to an electric brake motor of a brake drive associated with a back wheel of the vehicle.

In a further variant of this embodiment, the controller is further configured to:

repeat the steps of generating a test current value and an expected brake effect value, instructing the brake power source of a brake drive to supply a test current to the electric brake motor of the brake drive, receiving a brake effect measurement value from the sensor, and comparing the brake effect measurement value with the expected brake effect value to obtain a diagnostic result at least four times;

in each repetition of the step of instructing the brake power source of the brake drive to supply a test current to the electric brake motor of the brake drive, instruct the brake power source to supply a respective test current value to an electric brake motor of brake drives associated with a different pair of a front wheel and a rear wheel of the vehicle;

in each repetition of the step of receiving the brake effect measurement value from the sensor of the electronic brake system, receiving a single brake effect measurement value representing the brake effect on the vehicle as a result of the combined brake force generated by the interaction of a brake disc of the electronic brake system and a brake pad of a brake drive of the electronic brake system associated with the front wheel and the interaction of a brake disc of the electronic brake system and a brake pad of a brake drive of the electronic brake system associated with the rear wheel;

obtain an aggregated diagnostic result that represents a deduced braking quality of each pair of interacting brake disc of the electronic brake system and brake pad of the brake drive of the electronic brake system.

Figure 2:
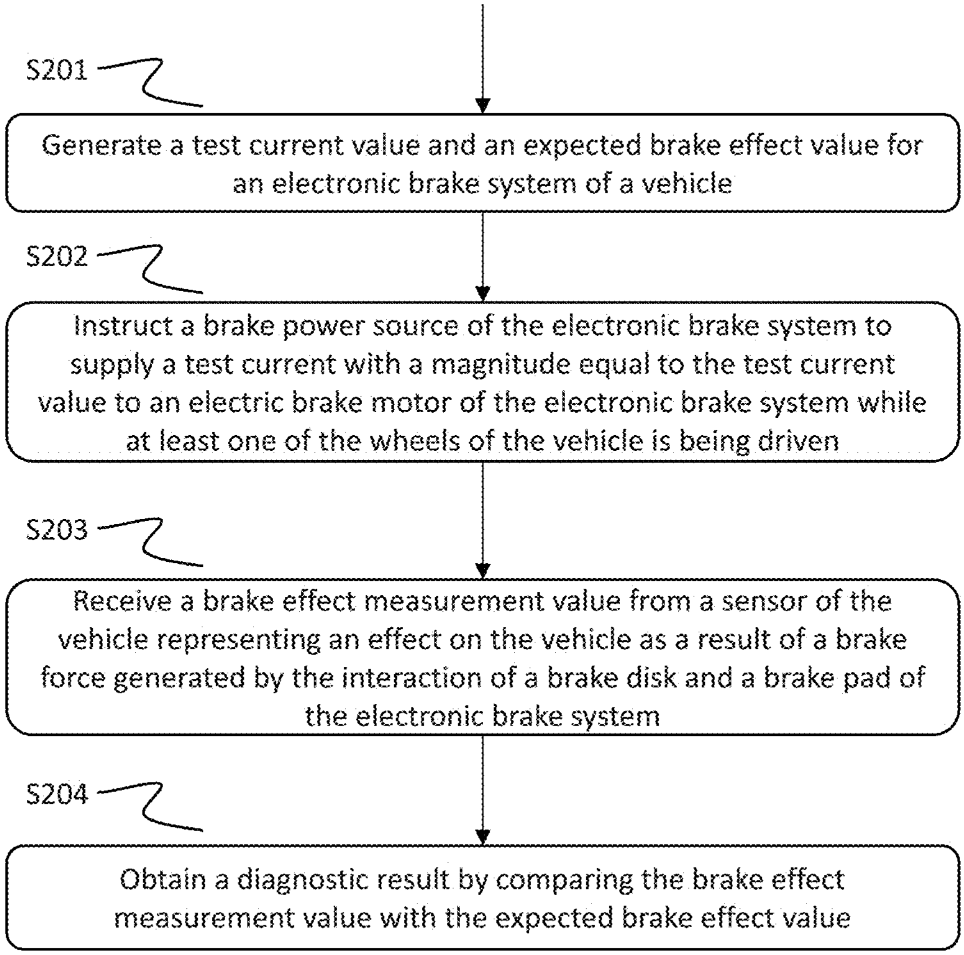
Figure 3:
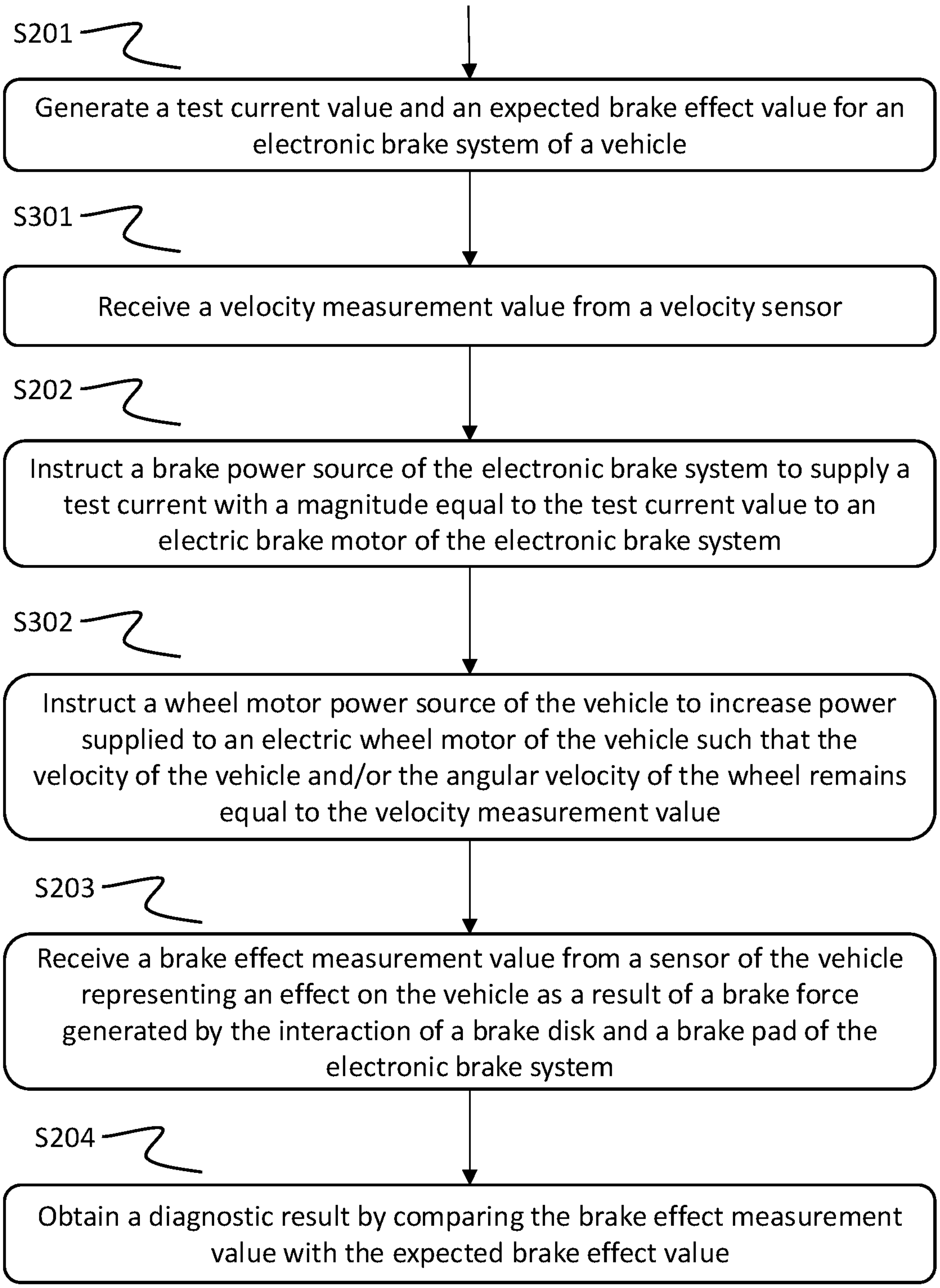
Figure 4:
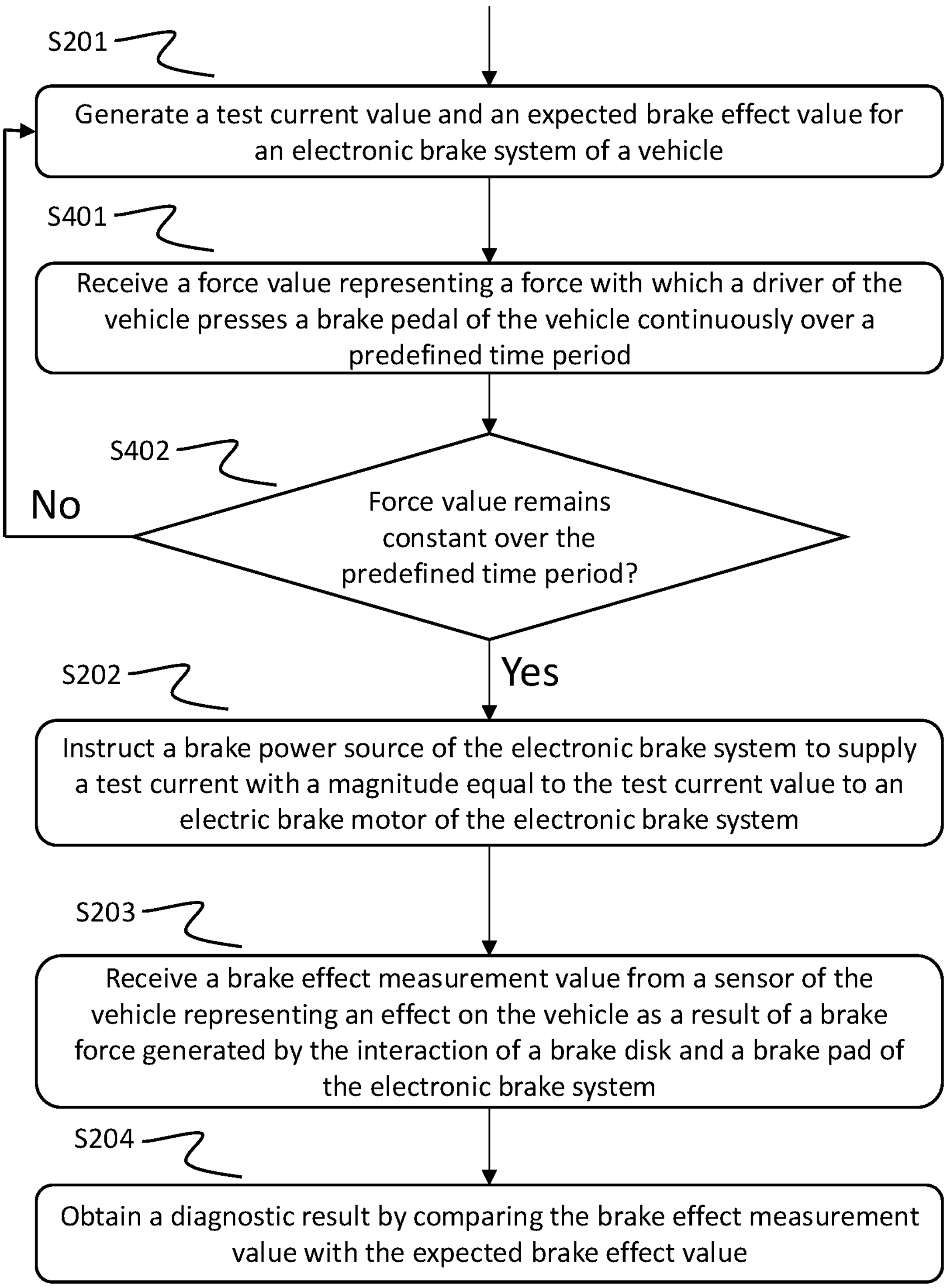
Figure 5:
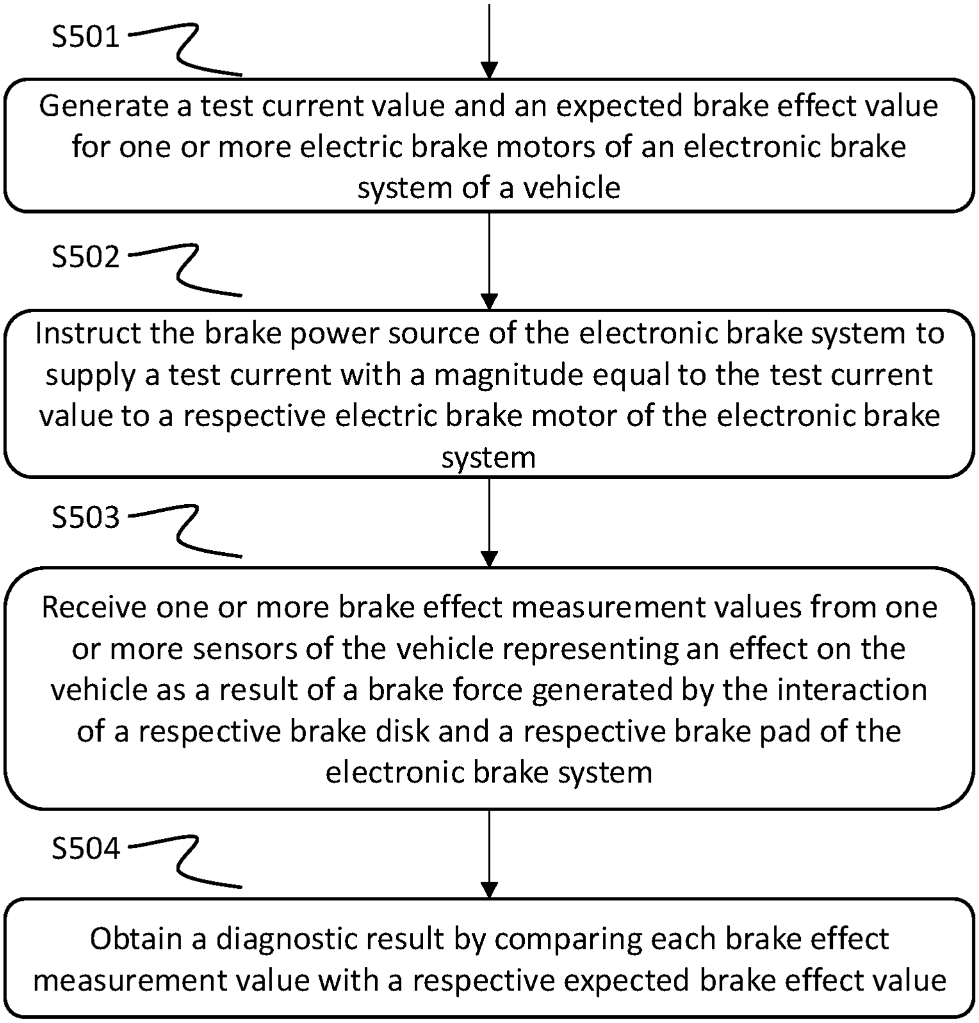
Figure 6:
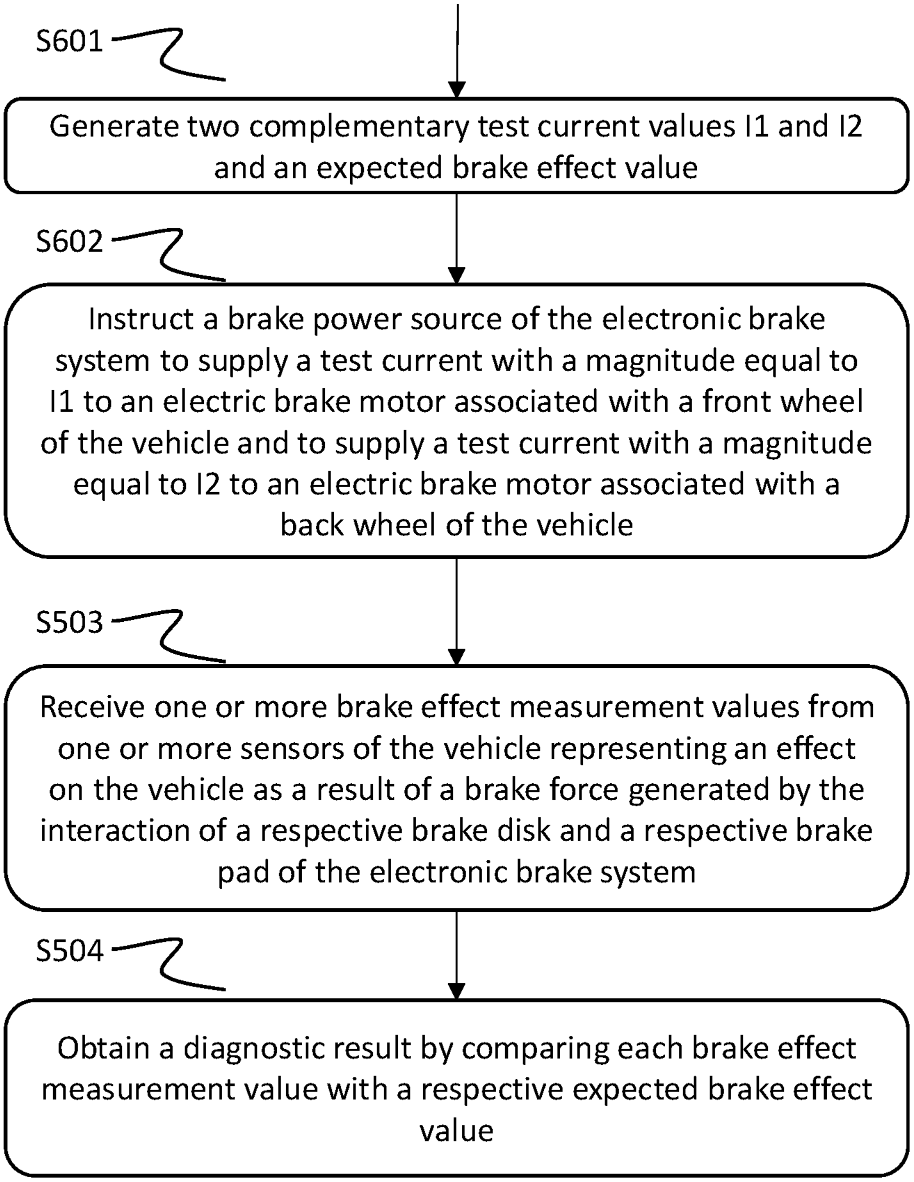
Figure 7:
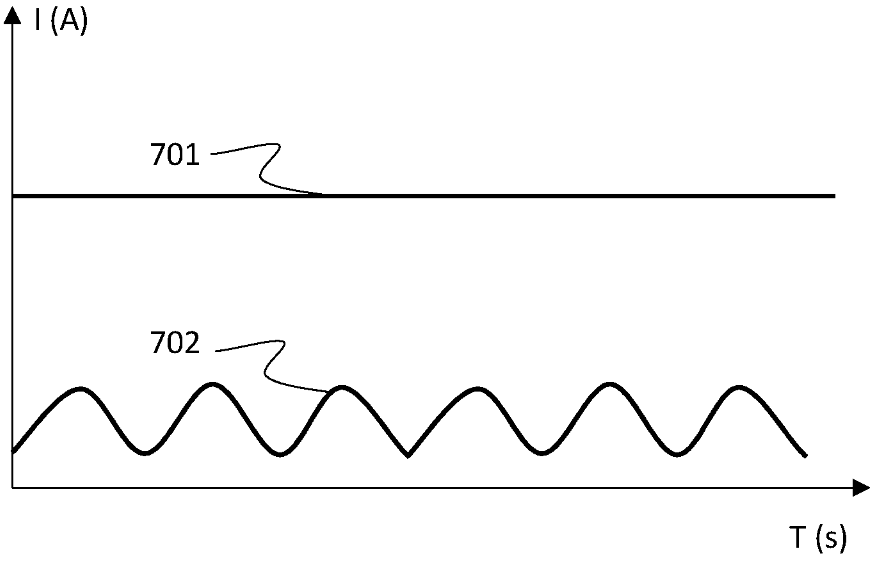

The invention will be described in more detail below under reference to the drawing, in which in a non-limiting manner exemplary embodiments of the invention will be shown. In the figures:

FIG. 1 schematically shows a vehicle according to an embodiment of the vehicle according to the invention;

FIG. 2 schematically shows a flow diagram of a method according to a first embodiment of the method according to the invention;

FIG. 3 schematically shows a flow diagram of a method according to a second embodiment of the method according to the invention;

FIG. 4 schematically shows a flow diagram of a method according to a third embodiment of the method according to the invention;

FIG. 5 schematically shows a flow diagram of a method according to a fourth embodiment of the method according to the invention;

FIG. 6 schematically shows a flow diagram of a method according to a fifth embodiment of the method according to the invention;

FIG. 7 schematically shows a current signal over time as generated in multiple embodiments of the method according to the invention.

FIG. 1 schematically shows a vehicle according to an embodiment of the vehicle according to the invention.

The vehicle 108 comprises four wheels 101*a*, 101*b*, 101*c*, and 101*d*. Each wheel 101*a*, 101*b*, 101*c*, and 101*d* is associated with a respective brake disc 102*a*, 102*b*, 102*c*, and 102*d*. Each wheel 101*a*, 101*b*, 101*c*, and 101*d* is further associated with a respective brake drive. The respective brake drives comprise a respective brake pad 103*a*, 103*b*, 103*c*, and 103*d*. The respective brake drives further comprise a respective electric brake motor 104*a*, 104*b*, 104*c*, and 104*d*.

The vehicle 108 further comprises a brake power source 105. The brake power source 105 is electrically connected to the electric brake motors 104*a*, 104*b*, 104*c*, and 104*d* such that it is able to supply power to the electric brake motors 104*a*, 104*b*, 104*c*, and 104*d*. The brake power source 105 is a battery of the vehicle 108. The vehicle 108 has a central battery used to power the electrical components of the vehicle 108, including the electronic brake system 109. The electric brake power source 105 is configured to be instructed to supply a specified current to the electric brake motor 104*a*, 104*b*, 104*c*, and 104*d*. An instruction to the electric brake power source 105 corresponds to a brake action of a driver of the vehicle 108 or of an automated system of the vehicle 108. In response to the instruction, at least one of the electric brake motors 104*a*, 104*b*, 104*c*, and 104*d* is driven and at least one associated brake pad 103*a*, 103*b*, 103*c*, and 103*d* moves towards the brake disc such that it comes into contact with at least one brake disc 102*a*, 102*b*, 102*c*, and 102*d*. The interaction between the at least one brake pad 103*a*, 103*b*, 103*c*, and 103*d* and the respective at least one brake disc 102*a*, 102*b*, 102*c*, and 102*d* generates a frictional force, slowing down the vehicle 108 and/or the rotation of at least one wheel 101*a*, 101*b*, 101*c*, and 101*d* associated with the at least one brake disc 102*a*, 102*b*, 102*c*, and 102*d*. There is a relation between: 1) the brake action, i.e., a requested brake force, represented for example by the force with which the driver of the vehicle 108 presses a brake pedal of the vehicle 108; 2) the current requested to be supplied from the brake power source 105 to the at least one electric brake motor 104*a*, 104*b*, 104*c*, and 104*d*; 3) the frictional force generated by the interaction between the at least one brake pad 103*a*, 103*b*, 103*c*, and 103*d* and the at least one brake disc 102*a*, 102*b*, 102*c*, and 102*d*; and 4) the effect of the brake action on the vehicle 108, being a reduction in the speed and/or velocity of the vehicle 108 and/or a reduction in the rotational velocity and/or the rotational speed of the at least one wheel 101*a*, 101*b*, 101*c*, and 101*d* associated to the at least one brake disc 102*a*, 102*b*, 102*c*, and 102*d*. The relation between the requested brake force and the requested current is implemented in a look-up table.

Due to a variety of reasons, such as wear and tear, the brake effect on the vehicle 108 in some cases is reduced as compared to the expected brake effect. If the brake effect is significantly reduced, safety of the vehicle 108 is reduced. For example, the brake distance of the vehicle 108 is significantly extended. In some other cases, the brake effect of the vehicle 108 is increased as compared to the expected brake effect. This is for example the case if there is a misalignment of a brake pad 103*a*, 103*b*, 103*c*, and 103*d* with its associated brake disc 102*a*, 102*b*, 102*c*, 102*d*.

The vehicle 108 further comprises a sensor 106. For example, the sensor 106 is a velocity sensor for measuring the velocity at which the vehicle 108 is being driven on a surface. For another example, the sensor 106 is an acceleration sensor for measuring the rate of deceleration and/or acceleration of the vehicle 108. For another example, the sensor 106 is a power sensor for measuring the voltage and/or current and/or power being supplied to an in-wheel motor or the central motor of the vehicle 108. For another example, the sensor 106 is an angular velocity sensor for measuring the angular rotation of the wheel, for example a tachometer.

The vehicle 108 further comprises a controller 107. The controller 107 is configured to execute the method according to any one of embodiments of the method according to the invention described above or below. The controller 107 is connected to the sensor 106, and through the connection to the sensor, is configured to receive signals from the sensor 106, wherein the signals represent brake effect measurement values. The controller 107 is further connected to the brake power source 105. Through the connection to the brake power source 105, the controller 107 can send signals to the brake power source 105. Said signals correspond to requests for a current, such as a test current, to be supplied from the brake power source 105 to one or more of the electric brake motors 104*a*, 104*b*, 104*c*, and 104*d*.

The brake pads 103*a*, 103*b*, 103*c*, 103*d*, electric brake motors 104*a*, 104*b*, 104*c*, 104*d*, brake discs 102*a*, 102*b*, 102*c*, 102*d*, brake power source 105, sensor 106, and control unit 107 form the electronic brake system 109 of the vehicle 108.

FIG. 2 shows a first embodiment of the method according to the invention. The figure schematically shows the sequential steps of the method in a flow diagram.

The method shown in FIG. 2 is used for diagnosing an electronic brake system of a vehicle 108 while at least one wheels 101*a*, 101*b*, 101*c*, 101*d* of the vehicle 108 is being driven. The vehicle is a vehicle 108 shown in FIG. 1. The electronic brake system is an electronic brake system 109 as shown in FIG. 1.

The method starts with a first step S201 of generating a test current value and an expected brake effect value, the expected brake effect value being deduced from the test current value based on characteristics of the vehicle 108.

Then, in step S202, a brake power source of the electronic brake system is instructed to supply a test current with a magnitude equal to the test current value to an electric brake motor 104*a*, 104*b*, 104*c*, 104*d* of the electronic brake system 109 while at least one of the wheels 101*a*, 101*b*, 101*c*, 101*d* of the vehicle 108 is being driven. As a result of the frictional force generated by a brake pad 103*a*, 103*b*, 103*c*, 103*d* coming into contact with a respective brake disc 102*a*, 102*b*, 102*c*, 102*d*, the rotational speed and/or rotational velocity of a wheel 101*a*, 101*b*, 101*c*, 101*d* associated to the brake disc 102*a*, 102*b*, 102*c*, 102*d* is reduced.

Then, in step S203, a brake effect measurement value is received from a sensor 106 of the vehicle 108 representing an effect on the vehicle 108 as a result of a brake force generated by the interaction of a brake disc 102*a*, 102*b*, 102*c*, 102*d* and a brake pad 103*a*, 103*b*, 103*c*, 103*d* of the electronic brake system 109.

Herewith, the method provides for a comparison of an actual effect of a brake action as the result of providing a test current to an electric brake motor 104*a*, 104*b*, 104*c*, 104*d* of an electronic brake system 109 and a desired effect of that brake action. By performing the method while the wheel 101*a*, 101*b*, 101*c*, 101*d* of the vehicle 108 is being driven, an accurate diagnostic result is obtained by relying on a sensor 106 that measure the effect of the brake action.

This embodiment is explained with reference to a number of examples according to the first embodiment.

In a first example, the vehicle 108 is driven by a driver who controls the velocity and/or speed of the vehicle 108 by pressing a gas pedal of the vehicle 108.

In step S201, the test current value is for example 0.1 A. The expected brake effect value corresponding to this test current value is a deceleration of the vehicle 108 by 0.2 $m/s^2$. So it is expected that the vehicle 108 will slow down by a constant deceleration over time until it comes to a standstill.

In step S202, a test current equal to 0.1 A is supplied from the brake power source 105 to at least one of the electric brake motors 104*a*, 104*b*, 104*c*, 104*d*, for example electric brake motor 104*a*. The test current being supplied to the electric brake motor 104*a* results in the electric brake motor 104*a* moving the brake pad 103*a* towards the brake disc 102*a*. When the brake pad 103*a* comes into contact with the brake disc 102*a*, a frictional force is generated and the vehicle slows down.

In step S203, sensor 106 is a velocity sensor used to measure the velocity at which the vehicle 108 is being driven on a surface. The velocity can then be compared, while the test current is being applied, to an initial velocity of the vehicle 108 to deduce the deceleration of the vehicle 108. Alternatively, sensor 106 is an acceleration sensor used to measure the acceleration, or in this case, the deceleration, of the vehicle 108 while the test current is being applied. The deceleration measured by the sensor is for example 0.12 $m/s^2$.

Last, in step S204, the expected deceleration of 0.2 $m/s^2$ is compared to the actual deceleration 0.12 $m/s^2$ measured by the sensor 106. The diagnostic result in this case indicates that the measured brake effect value is 60% of the expected brake effect value, and thus the effectiveness of the brake is reduced by 40%.

In a second example, the vehicle 108 is driven by an automated system, such as for example a cruise control system. The vehicle is for example driven at 100 km/h.

In step S201, the test current value is for example 0.2 A. The expected brake effect value corresponding to this test current value is an increase in the current supplied to the in-wheel motor to keep the vehicle 108 travelling at the constant velocity of 100 km/h of 0.4 A.

In step S202, a test current equal to 0.2 A is supplied from the brake power source 105 to at least one of the electric brake motors 104*a*, 104*b*, 104*c*, 104*d*, for example electric brake motor 104*c*. The test current being supplied to the electric brake motor 104*c* results in the electric brake motor 104*c* moving the brake pad 103*c* towards the brake disc 102*c*. When the brake pad 103*c* comes into contact with the brake disc 102*c*, a frictional force is generated, slowing down the vehicle 108. This causes the cruise control system to react by increasing the power supplied to the in-wheel motor associated to the wheel 101*c* in order to keep the vehicle travelling at the constant velocity of 100 km/h.

In step S203, the sensor 106 is a current sensor used for measuring the current being supplied to the in-wheel motor. The measurement value obtained by the sensor 106 in this step is compared to a measurement of the current being supplied to the in-wheel motor before the test current was supplied to the electric brake motor 104*c*. The increase in the current supplied to the in-wheel motor is for example 0.36 A.

Last, in step S204, the expected increase in current supplied to the in-wheel motor, 0.4 A, is compared to the actual increase, 0.36 A, measured by the sensor 106. The diagnostic result in this case indicates that the measured brake effect value is 90% of the expected brake effect value, and thus the effectiveness of the brake associated with the wheel 101*c* is reduced by 10%.

In a third example, at least one of the wheels 101*a*, 101*b*, 101*c*, 101*d* is driven when the vehicle 108 is not being driven. This is achieved by the vehicle 108 being positioned on a test bed, whereby the wheels 101*a*, 101*b*, 101*c*, 101*d* are suspended in the air or are located on rolling elements. This means that the rotational velocity and/or speed of at least one of the wheels 101*a*, 101*b*, 101*c*, 101*d*, for example wheel 101*b*, is non-zero, but the vehicle 108 remains stationary, i.e., the velocity and/or speed of the vehicle 108 is zero.

In step S201, the test current value is for example 0.5 A. The expected brake effect value corresponding to this test current value is a deceleration of the rotation of the wheel 101*b* associated to the electric brake motor 104*b* by 400 $rpm^2$. So it is expected that the rotation of the wheel 101*b* will slow down by a constant deceleration over time until it is at rest.

In step S202, a test current equal to 0.5 A is supplied from the brake power source 105 to the electric brake motor 104*b*. The test current being supplied to the electric brake motor 104*b* results in the electric brake motor 104*b* moving the brake pad 103*b* towards the brake disc 102*b*. When the brake pad 103*b* comes into contact with the brake disc 102*b*, a frictional force is generated and the rotational velocity of the wheel 101*b* slows down.

In step S203, the sensor 106 is a rotational velocity sensor used to measure the rotational velocity of the wheel 101*b*. The velocity is then compared, while the test current is being applied, to an initial velocity of the wheel 101*b* to deduce the deceleration of the wheel 101*b*. The deceleration measured by the sensor is for example 320 $rpm^2$.

Last, in step S204, the expected deceleration of 400 $rpm^2$ is compared to the actual deceleration 320 $rpm^2$ measured by the sensor 106. The diagnostic result in this case will indicate that the measured brake effect value is 80% of the expected brake effect value, and thus the effectiveness of the brake is reduced by 20%.

FIG. 3 shows a second embodiment of the method according to the invention. The figure schematically shows the sequential steps of the method in a flow diagram.

The second embodiment is an extension of the first embodiment. The method of the second embodiment implements a variant of the first embodiment and comprises the steps S201, S202, S203, and S204.

The method of the second embodiment further comprises step S301, wherein a velocity measurement is received from a velocity sensor of the vehicle 108.

Step S301 in this embodiment is performed after step S201. Alternatively, step S301 is performed before step S201.

The method of the second embodiment further comprises step S302, wherein a wheel motor power source of the vehicle 108 is instructed to increase power supplied to an electric wheel motor of the vehicle 108 such that the velocity of the vehicle 108 and/or the angular velocity of at least one wheel 101*a*, 101*b*, 101*c*, 101*d* remains equal to the velocity measurement value.

Step S302 in this embodiment is performed after step S202 and before step S203.

This embodiment is further explained according to an example. In the example, the method is performed when the vehicle 108 and/or the at least one wheel 101*a*, 101*b*, 101*c*, 101*d* of the vehicle 108 is being driven at a constant velocity and/or at a constant speed. The velocity and/or the speed of the vehicle 108 is maintained by an automated system such as a cruise control system.

In the example, the velocity sensor is a sensor configured to measure the speed of the vehicle when it is travelling on a surface, such as a road. The sensor is a dedicated velocity sensor of the vehicle and is distinct from the sensor 106. For example, the velocity measurement received in step S301 indicates that the vehicle is being driven at a velocity of 70 km/h.

Further, in the example, the wheel motor power source is a central battery of the vehicle 108 and is identical to the brake power source 105. The electric wheel motor is adapted to drive one or more wheels 101*a*, 101*b*, 101*c*, 101*d* of the vehicle. In the example, each wheel 101*a*, 101*b*, 101*c*, 101*d* is associated with an in-wheel motor. An in-wheel motor exclusively drives the wheel with which it is associated. In the example, the test current is applied to electric brake motor 104*d*. The power supplied from the wheel motor power source 105 to the electric wheel motor that is associated to the wheel 101*d* is increased to mitigate the effect of the brake pad 103*d* being pressed against the brake disc 102*d*. Thus, to make the diagnostic method unnoticeable for the driver of the vehicle 108, the speed of the vehicle 108 and/or at least one of the wheels 101*a*, 101*b*, 101*c*, 101*d* of the vehicle 108 is maintained during the performing of the steps of the diagnostic method.

In the example, the sensor 106 is a power sensor, wherein the power sensor is configured to measure the increase in power supplied from the wheel motor power source 105 to the electric wheel motor associated with wheel 101*d*. Thus, the brake effect measurement value is characterized by an increase in power supplied from the wheel motor power source 105 to the electric wheel motor. The diagnostic result then is characterized by the difference between an expected increase in the power supplied from the wheel motor power source to the electric wheel motor and the brake effect measurement value.

FIG. 4 shows a third embodiment of the method according to the invention. The figure schematically shows the sequential steps of the method in a flow diagram.

The third embodiment is an extension of the first embodiment. The method of the third embodiment implements a variant of the first embodiment and comprises the steps S201, S202, S203, and S204.

The method of the second embodiment further comprises step S401, wherein a force value is received, representing a force with which a driver of the vehicle 108 presses a brake pedal of the vehicle 108 continuously over a predefined time period.

Step S401 is performed after step S201. Alternatively, step S401 is performed before step S201.

The method of the second embodiment further comprises step S402, wherein it is checked whether the force value remains constant over the predefined time period.

In this embodiment, step S202 is only performed when the force value remains constant over the predefined test period. If the force value does not remain constant over the predefined test period, the diagnostic method returns to step S201.

In an example, in step S401, the brake pedal of the vehicle is used by the driver of the vehicle 108 to perform a brake action. By pressing the brake pedal with a particular force, the brake power source 105 is instructed to supply power to one or more electric brake motors 104*a*, 104*b*, 104*c*, 104*d*. Thus, in this embodiment, the driver is performing a brake action during the performing of the steps of the diagnostic method. Thus, further, a current that is proportional to the force with which the brake pedal is pressed is supplied from the brake power source 105 to one or more electric brake motors 104*a*, 104*b*, 104*c*, 104. For example, the force applied by the driver is 100 N and the current is 3 A.

The predefined test period in the example is 2 s. To get an accurate measurement of the brake effect in step S203, it is checked whether the driver is pressing the brake pedal with a constant force. In this example, the force is measured directly using a strain gauge or piezoelectric element connected to the brake pedal.

In the example, the method waits for a time period of 10 s before attempting to continue the diagnostic method if it is determined in step S402 that the force value does not remain constant over the predefined time period.

In a variant of this example, the method continuously monitors the force with which the driver of the vehicle presses the brake pedal in steps S401 and S402. In this alternative example, when the condition is satisfied that the force value remains constant over the predefined time period, the method continues to step S202. For example, the force with which the driver of the vehicle presses the brake pedal is monitored using a "sliding window" equal to the predefined test period, which is for example 5s. In this sliding window, force values received from an appropriate sensor are compared. When in the window the force values remain constant, the method continues to step S202. In this variant, the method does not return to step S201 if the force value does not remain constant over the predefined test period. Rather, steps S401 and S402 are repeated until the force value remains constant over the predefined time period.

In this embodiment, the force value is considered to remain constant if the force values obtained from the sensor 106 remain within a tolerance of 1% to 5% of each other.

In this embodiment, in step S202, the magnitude of the total current supplied to at least one of the electric brake motors 104*a*, 104*b*, 104*c*, 104*d* is equal to the sum of the test current value and the current applied to the respective electric brake motor as a result of the brake action of the driver of the vehicle. In other words, the current applied to at least one of the electric brake motors 104*a*, 104*b*, 104*c*, 104*d* is increased by an amount equal to the test current value.

FIG. 5 shows a fourth embodiment of the method according to the invention. The figure schematically shows the sequential steps of the method in a flow diagram.

The method shown in FIG. 5 is used for diagnosing an electronic brake system 109 of a vehicle while at least one wheel 101*a*, 101*b*, 101*c*, 101*d* of the vehicle is being driven.

In this embodiment, the electronic brake system 109 comprises a plurality of electric brake motors 104*a*, 104*b*, 104*c*, 104*d* and one or more sensors 106 which is present in a vehicle 108 comprising a plurality of wheels 101*a*, 101*b*, 101*c*, 101*d*, each electric brake motor 104*a*, 104*b*, 104*c*, 104*d* being associated with a respective wheel 101*a*, 101*b*, 101*c*, 101*d* of the vehicle.

The method starts with a first step S501 of generating a test current value and an expected brake effect value for one or more electric brake motors 104*a*, 104*b*, 104*c*, 104*d* of an electronic brake system 109 of a vehicle 108. Thus, the step is equivalent to the step S201 of the first embodiment, except that one or more test current values and one or more expected brake effect values are generated.

Then, in step S502, the brake power source 105 of the electronic brake system 109 is instructed to supply a test current with a magnitude equal to the test current value to a respective electric brake motor 104*a*, 104*b*, 104*c*, 104*d* of the electronic brake system 109.

Then, in step S503, one or more brake effect measurement values from one or more sensors 106 of the vehicle 108 are received, representing an effect on the vehicle 108 as a result of a brake force generated by the interaction of a respective brake disc 102*a*, 102*b*, 102*c*, 102*d* and a respective brake pad 103*a*, 103*b*, 103*c*, 103*d* of the electronic brake system 109. Last, in step S504, a diagnostic result is obtained by comparing each brake effect measurement value with a respective expected brake effect value. The diagnostic result thus aggregates the comparisons of the brake effect measurement values with their respective expected brake effect values.

This embodiment is explained with reference to a number of examples according to the fourth embodiment.

In a first example, the vehicle 108 is driven by an automated system, such as for example a cruise control system. The vehicle 108 is for example driven at 100 km/h.

In step S501, exactly one test current value and exactly one expected brake effect value is generated for each electric brake motor 104*a*, 104*b*, 104*c*, 104*d* of the electronic brake system 109. In this example, four test current values are generated and four expected brake effect values are generated. For example, the four test current values are 0.1 A, 0.2 A, 0.1 A, and 0.2 A for electric brake motor 104*a*, 104*b*, 104*c*, 104*d* respectively. The expected brake effect values corresponding to these test current values is an increase in the current supplied to the in-wheel motors associated to the wheels 101*a*, 101*b*, 101*c*, 101*d* to keep the vehicle 108 travelling at the constant velocity of 100 km/h. In the example, the expected brake effect values are 0.2 A, 0.4 A, 0.2 A, and 0.4 A for electric brake motor 104*a*, 104*b*, 104*c*, 104*d* respectively.

In step S502, test currents equal to 0.1 A, 0.2 A, 0.1 A, and 0.2 A are supplied from the brake power source 105 to electric brake motors 104*a*, 104*b*, 104*c*, 104*d*, respectively. The test currents being supplied to the electric brake motors 104*a*, 104*b*, 104*c*, 104*d* result in the electric brake motor 104*a*, 104*b*, 104*c*, 104*d* moving the brake pad 103*a*, 103*b*, 103*c*, 103*d*, respectively towards the brake disc 102*a*, 102*b*, 102*c*, 102*d*, respectively. When a brake pad 103*a*, 103*b*, 103*c*, 103*d* comes into contact with a brake disc 102*a*, 102*b*, 102*c*, 102*d*, a frictional force is generated, slowing down the vehicle 108. This causes the cruise control system to react by increasing the power supplied to the in-wheel motor associated to the wheels 101*a*, 101*b*, 101*c*, 101*d* in order to keep the vehicle travelling at the constant velocity of 100 km/h.

In step S503, the sensor 106 is a current sensor used for measuring the current being supplied to each in-wheel motor. In the example, the sensor 106 is a distributed sensor, thus the sensor 106 comprises four sensors, each of the four sensors being associated to a respective in-wheel motor of the vehicle 108. The measurement value obtained by the sensor 106 is compared to a measurement of the current being supplied to the in-wheel motors before the test current was supplied to the electric brake motors 104*a*, 104*b*, 104*c*, 104*d*. The increase in the current supplied to the in-wheel motors associated to the wheels 101*a*, 101*b*, 101*c*, 101*d* is for example 0.1 A, 0.4 A, 0.1 A, and 0.3 A.

In step S504, each expected brake effect measurement value is compared with a respective expected brake effect value. The diagnostic result in this example indicates that the effectiveness of the brake associated to the wheels 101*a*, 101*b*, 101*c*, 101*d* is reduced by 50%, 0%, 50%, and 25% respectively. The average effectiveness of the brakes of the vehicle 108 are thus reduced by approximately 31%.

In a second example, at least one wheel 101*a*, 101*b*, 101*c*, 101*d* is driven when the vehicle 108 is not being driven. This is achieved by the vehicle being positioned on a test bed, whereby the wheels 101*a*, 101*b*, 101*c*, 101*d* are suspended in the air or are located on rolling elements. This means that the rotational velocity and/or speed of at least one of the wheels 101*a*, 101*b*, 101*c*, 101*d*, for example wheel 101*b*, is non-zero, but the vehicle remains stationary, i.e., the velocity and/or speed of the vehicle is zero.

In step S501, exactly one test current value and exactly one expected brake effect value are generated for each electric brake motor 104*a*, 104*b*, 104*c*, 104*d* of the electronic brake system 109. In this example, four test current values and four expected brake effect values are generated. For example, the four test current values are 0.1 A, 0.2 A, 0.3 A, and 0.4 A for electric brake motor 104*a*, 104*b*, 104*c*, 104*d* respectively. The brake effect values represent the expected brake effect of supplying a current with a magnitude equal to a respective test current value to each electric brake motor 104*a*, 104*b*, 104*c*, 104*d* of the electronic brake system 109. The expected brake effect value represents a reduction in the rotational speed of each wheel 101*a*, 101*b*, 101*c*, 101*d*. The expected brake effect values correspond to a deceleration of the rotation of the wheels 101*a*, 101*b*, 101*c*, 101*d* by 80 $rpm^2$, 160 $rpm^2$, 240 $rpm^2$ and 320 $rpm^2$, respectively. So it is expected that the rotation of the wheels 101*a*, 101*b*, 101*c*, 101*d* will slow down by a constant deceleration over time until it is at rest.

In step S502, test currents equal to 0.1 A, 0.2 A, 0.3 A, and 0.4 A are supplied from the brake power source 105 to electric brake motors 104*a*, 104*b*, 104*c*, 104*d*, respectively. The test currents being supplied to the electric brake motors 104*a*, 104*b*, 104*c*, 104*d* results in the electric brake motor 104*a*, 104*b*, 104*c*, 104*d* moving the brake pad 103*a*, 103*b*, 103*c*, 103*d*, respectively towards the brake disc 102*a*, 102*b*, 102*c*, 102*d*, respectively. When a brake pad 103*a*, 103*b*, 103*c*, 103*d* comes into contact with a brake disc 102*a*, 102*b*, 102*c*, 102*d*, a frictional force is generated, slowing down the rotation of the wheels 101*a*, 101*b*, 101*c*, 101*d*. This causes the rotational velocity of the wheels 101*a*, 101*b*, 101*c*, 101*d* to be reduced.

In step S503, the sensor 106 is a rotational velocity sensor used to measure the rotational velocity of the wheels 101*a*, 101*b*, 101*c*, 101*d*. In the example, the sensor 106 is a distributed sensor, thus the sensor 106 comprises four sensors, each of the four sensors being associated to a respective wheel 101*a*, 101*b*, 101*c*, 101*d* of the vehicle. The rotational velocity is then compared, while the test current is being applied, to a respective initial rotational velocity of the wheel 101*a*, 101*b*, 101*c*, 101*d* to deduce the respective rotational deceleration of the wheels 101*a*, 101*b*, 101*c*, 101*d*. The rotational decelerations measured by the sensor is for example 80 $rpm^2$, 120 $rpm^2$, 120 $rpm^2$ and 288 $rpm^2$, respectively.

In step S504, each expected brake effect measurement value is compared with a respective expected brake effect value. The diagnostic result in this example indicates that the effectiveness of the brake associated to the wheels 101*a*, 101*b*, 101*c*, 101*d* is reduced by 0%, 25%, 50%, and 10% respectively. The average effectiveness of the brakes of the vehicle 108 are reduced by approximately 21%.

FIG. 6 shows a fifth embodiment of the method according to the invention. The figure schematically shows the sequential steps of the method in a flow diagram.

The fifth embodiment is a variant of the fourth embodiment. The method of the fifth embodiment comprises the sequential steps S601, S602, S503, and S504.

Step S601 is a variant of step S501. In step S601, two complementary test current values I1 and I2 and an expected brake effect value are generated. I1 and I2 are complementary, which means that they are chosen such that the brake effect of two or more brake actions compensate each other. This means that, in case the brakes are functioning correctly, the combined brake effect of the two or more brake actions result in a constant, smooth deceleration of the vehicle 108 and/or the wheels 101*a*, 101*b*, 101*c*, 101*d*. In case one brake is malfunctioning, the combined brake effect of the two or more brake actions result in a non-constant, fluctuating deceleration of the vehicle 108 and/or the wheels 101*a*, 101*b*, 101*c*, 101*d*. The two or more brake actions correspond to the application of a test current to two or more electric brake motors 104*a*, 104*b*, 104*c*, 104*d* of the electronic brake system 109, wherein the test current is I1 or I2.

Step S602 is a variant of step S502. In step S602, a brake power source of the electronic brake system 109 to supply a test current with a magnitude equal to I1 to an electric brake motor 104*a*, 104*b* associated with a front wheel 101*a*, 101*b* of the vehicle 108 and to supply a test current with a magnitude equal to I2 to an electric brake motor 104*c*, 104*d* associated with a back wheel 101*a*, 101*b* of the vehicle 108.

In an example, in step S601, 11 is 0.1 A and 12 is 0.2 A. The expected brake effect value corresponding to the application of these test current values is a deceleration of the vehicle 108 by 0.3 $m/s^2$. So it is expected that the vehicle 108 will slow down by a constant deceleration over time until it comes to a standstill.

In step S602, a test current equal to 0.1 A is supplied from the brake power source 105 to electric brake motors 104*a*, and 104*c*, and a test current equal to 0.2 A is supplied from the brake power source 105 to electric brake motors 104*b* and 104*d*. The test currents being supplied to the electric brake motors 104*a*, 104*b*, 104*c*, 104*d* results in the electric brake motor 104*a*, 104*b*, 104*c*, 104*d* moving the brake pad 103*a*, 103*b*, 103*c*, 103*d*, respectively towards the brake disc 102*a*, 102*b*, 102*c*, 102*d*, respectively. When a brake pad 103*a*, 103*b*, 103*c*, 103*d* comes into contact with a brake disc 102*a*, 102*b*, 102*c*, 102*d*, a frictional force is generated, slowing down the vehicle 108.

In step S503, sensor 106 is a velocity sensor used to measure the velocity at which the vehicle is being driven on a surface. The velocity can then be compared, while the test current is being applied, to an initial velocity of the vehicle to deduce the deceleration of the vehicle. Alternatively, sensor 106 is an acceleration sensor used to measure the acceleration, or in this case, the deceleration, of the vehicle 108 while the test current is being applied. The deceleration measured by the sensor is for example 0.24 $m/s^2$.

Last, in step S204, the expected deceleration of 0.3 $m/s^2$ is compared to the actual deceleration 0.24 $m/s^2$ measured by the sensor 106. The diagnostic result in this case indicates that the measured brake effect value is 80% of the expected brake effect value, and thus the effectiveness of the brake is reduced by 20%.

In another example, the vehicle 108 is driven by an automated system, such as for example a cruise control system. The vehicle is for example driven at 100 km/h.

In step S601, 11 is 0.1 A+0.1 A*sin(t) and 12 is 0.1 A−0.1 A*sin(t). The expected brake effect value corresponding to the application of these test current values is an increase in the current supplied to the in-wheel motors to keep the vehicle 108 travelling at the constant velocity of 100 km/h. The expected increase is 0.2 A+0.2 A*sin(t) for the in-wheel motors compensating the application of test current value I1 to a respective electric brake motor 104*a*, 104*b*, 104*c*, 104*d*.

The expected increase is 0.2 A−0.2 A*sin(t) for the in-wheel motors compensating the application of test current value I2 to a respective electric brake motor 104*a*, 104*b*, 104*c*, 104*d*.

In step S602, a test current equal to 0.1 A+0.1 A*sin(t) is supplied from the brake power source 105 to electric brake motors 104*a* and 104*d*, and a test current equal to 0.1 A+0.1 A*sin (t) is supplied from the brake power source 105 to electric brake motors 104*b*, and 104*c*. The test currents being supplied to the electric brake motors 104*a*, 104*b*, 104*c*, 104*d* results in the electric brake motor 104*a*, 104*b*, 104*c*, 104*d* moving the brake pad 103*a*, 103*b*, 103*c*, 103*d*, respectively towards the brake disc 102*a*, 102*b*, 102*c*, 102*d*, respectively. When a brake pad 103*a*, 103*b*, 103*c*, 103*d* comes into contact with a brake disc 102*a*, 102*b*, 102*c*, 102*d*, a frictional force is generated, slowing down the vehicle 108.

In step S503, sensor 106 is a current sensor used for measuring the current being supplied to each in-wheel motor. In the example, the sensor 106 is a distributed sensor, thus the sensor 106 comprises four sensors, each of the four sensors being associated to a respective in-wheel motor of the vehicle 108. The measurement value obtained by the sensor 106 is compared to a measurement of the current being supplied to the in-wheel motors before the test current was supplied to the electric brake motors 104*a*, 104*b*, 104*c*, 104*d*. The increase in the current supplied to the in-wheel motors associated to the wheels 101*a* and 101*d* is for example 0.1 A+0.2 A*sin(t). The increase in the current supplied to the in-wheel motors associated to the wheels 101*b* and 101*c* is for example 0.2 A−0.3 A*sin(t).

In step S504, each expected brake effect measurement value is compared with a respective expected brake effect value. The diagnostic result in this example indicates that the effectiveness of the brake associated to the wheels 101*a* and 101*d* is reduced by approximately 33%. The diagnostic result in this example further indicates that the effectiveness of the brake associated to the wheels 101*b* and 101*c* is reduced by approximately 50%.

FIG. 7 schematically shows a current signal over time as generated in multiple embodiments of the method according to the invention.

In the figure, I is current and t is time.

In steps S201, in the first, second, and third embodiment, and S501, in the fourth and fifth embodiment, a test current value is generated. In a variant of these embodiments, the test current value is constant over the test time period. For example the test current value is 0.1 A or 1 A or 5 A. This is illustrated by the current signal 701 in the figure.

In another variant of this embodiment, the test current value is variable over the test time period. For example, the test current value is a continuous function. For example, the test current value is a sine wave or a cosine wave. This is illustrated by the current signal 702 in the figure.

The test time period can be the full time period shown in FIG. 7 or any sub-period of the full time period.

The invention claimed is:

1. A method for diagnosing an electronic brake system of a vehicle while at least one wheel of the vehicle is being driven, the method comprising the following steps:

generating a test current value and an expected brake effect value, the expected brake effect value being deduced from the test current value based on characteristics of the vehicle;

instructing a brake power source of the electronic brake system, which brake power source is configured to drive an electric brake motor of the electronic brake system, to supply a test current to the electric brake motor of the electronic brake system, the magnitude of the test current being equal to the test current value;

receiving a brake effect measurement value from a sensor of the vehicle, the brake effect measurement value representing an effect on the vehicle as a result of a brake force generated by the interaction of a brake disc and a brake pad of the electronic brake system, the interaction of the brake disc and the brake pad being the result of the brake pad being pressed against the brake disc by the electric brake motor of the electronic brake system, the brake disc being associated to a wheel of the vehicle;

obtaining a diagnostic result by comparing the brake effect measurement value with the expected brake effect value.

2. The method according to claim 1, wherein the method further comprises the following step:

before the step of instructing the brake power source of the electronic brake system to supply the test current to the electric brake motor of the electronic brake system, receiving a velocity measurement value from a velocity sensor, the velocity sensor being configured to measure a velocity of the vehicle and/or an angular velocity of the wheel, the wheel being driven by an electric wheel motor, the electric wheel motor being driven by a wheel motor power source;

and wherein the method further comprises the following step:

after instructing the brake power source of the electronic brake system to supply the test current to the electric brake motor of the electronic brake system, instructing the wheel motor power source to increase power supplied to the electric wheel motor such that the velocity of the vehicle and/or the angular velocity of the wheel remains equal to the velocity measurement value.

3. The method according to claim 2, wherein the brake effect measurement value is received from a power sensor, wherein the power sensor is configured to measure the increase in power supplied from the wheel motor power source to the electric wheel motor.

4. The method according to claim 1, wherein the method is performed when the vehicle and/or the at least one wheel of the vehicle is being driven at a constant velocity.

5. The method according to claim 4, wherein the method is performed when the constant velocity of the vehicle and/or the at least one wheel of the vehicle is maintained by an automated system.

6. The method according to claim 1, wherein the method further comprises the following steps, which are carried out after generating the test current value and the expected brake effect value:

receiving a force value representing a force with which a driver of the vehicle presses a brake pedal of the vehicle continuously over a predefined time period;

supplying the test current to the brake power source of the brake system only when the force value remains constant over the predefined time period.

7. The method according to claim 6, wherein the constant value is 0.

8. The method according to claim 1, wherein, in the step of instructing the brake power source of the electronic brake system to supply the test current to the electric brake motor of the electronic brake system, instructing the brake power source to provide the test current to the electric brake motor of the electronic brake system continuously over a test time period.

9. The method according to claim 8, wherein the test current value is constant over the test time period.

10. The method according to claim 8, wherein the test current value is variable over the test time period.

11. The method according to claim 1, wherein:

in an electronic brake system which comprises a plurality of electric brake motors in a vehicle comprising one or more sensors and a plurality of wheels, each electric brake motor being associated with a respective wheel of the vehicle, in the step of generating the test current value and the expected brake effect value, generating a test current value and an expected brake effect value for one or more of the electric brake motors of the electronic brake system;

in the step of instructing the brake power source of the electronic brake system to supply a test current to the electric brake motor of the electronic brake system, instructing the brake power source of the electronic brake system to supply a test current to a respective electric brake motor of the electronic brake system, the test current being equal to a respective test current value;

in the step of receiving the brake effect measurement value from the sensor of the electronic brake system, receiving one or more brake effect measurement values from one or more sensors of the vehicle, each brake effect measurement value of the one or more brake effect measurement values representing an effect on the vehicle as a result of a brake force generated by the interaction of a respective brake disc and a respective brake pad of the electronic brake system, the interaction of the respective brake disc and the respective brake pad being the result of the respective brake pad being pressed against the respective brake disc by the respective electric brake motor of the electronic brake system;

in the step of obtaining the diagnostic result, the diagnostic result is obtained by comparing each brake effect measurement value with a respective expected brake effect value.

12. The method according to claim 11, wherein:

in the step of generating the test current value and the expected brake effect value, generating two complementary test current values I1 and I2;

in the step of instructing the brake power source of the electronic brake system to supply a test current to the electric brake motor of the electronic brake system, instructing the brake power source to supply a test current equal to the test current value I1 to an electric brake motor associated with a front wheel of the vehicle, and instructing the brake power source to supply a test current equal to the test current value I2 to an electric brake motor associated with a rear wheel of the vehicle.

13. The method according to claim 12, wherein the steps of the method are repeated at least four times, wherein:

in each repetition of the step of instructing the brake power source of the electronic brake system to supply a test current to the electric brake motor of the electronic brake system, instructing the brake power source to supply a test current equal to a respective test current value to the electric brake motors associated with a different pair of a front wheel and a rear wheel of the vehicle;

in each repetition of the step of receiving the brake effect measurement value from the sensor of the electronic brake system, receiving a single brake effect measurement value representing the brake effect on the vehicle as a result of the combined brake force generated by the interaction of a brake disc and a brake pad of the electronic brake system associated with the front wheel and the interaction of a brake disc and a brake pad of the electronic brake system associated with the rear wheel;

in the step of aggregating the plurality of diagnostic results, obtaining an aggregated diagnostic result that represents a deduced braking quality of each pair of interacting brake disc and brake pad of the electronic brake system.

14. The method according to claim 1, wherein the steps of the method are repeated at least two times, wherein a diagnostic result is obtained in each repetition of the method, resulting in a plurality of diagnostic results, and wherein the method further comprises the following step:

aggregating the plurality of diagnostic results to obtain an aggregated diagnostic result.

15. A computer program comprising instructions which, when the program is executed by a computer, cause the computer to carry out the method of claim 1.

16. A vehicle comprising:

a wheel;

a sensor;

an electronic brake system, comprising:

a brake disc, the brake disc being associated with the wheel;

a brake drive comprising a brake pad and an electric brake motor;

a brake power source, wherein the brake power source is configured to drive the electric brake motor of the brake drive;

a controller;

wherein:

the brake pad is arranged to interact with the brake disc to generate a brake force as a result of the brake pad being pressed by the electric brake motor against the brake disc;

the sensor is configured to measure an effect on the vehicle as a result of the brake force generated by the brake pad pressing against the brake disc;

the controller is configured to perform the following steps while the wheel of the vehicle is being driven:

generate a test current value and an expected brake effect value, the expected brake effect value being deduced from the test current value based on characteristics of the vehicle;

instruct the brake power source of the brake drive to supply a test current to the electric brake motor of the brake drive, the magnitude of the test current being equal to the test current value;

receive a brake effect measurement value from the sensor;

compare the brake effect measurement value with the expected brake effect value to obtain a diagnostic result.

17. The vehicle according to claim 16, further comprising:

a velocity sensor, the velocity sensor being configured to measure the velocity of the vehicle and/or the angular velocity of the wheel;

an electric wheel drive comprising an electric wheel motor and a wheel motor power source, wherein the wheel motor power source is configured to drive the electric wheel motor of the electric drive, and the electric wheel motor is configured to drive the wheel;

wherein:

the controller is further configured to perform the following steps:

before the step of instructing the brake power source of the brake drive to supply the test current to the electric brake motor of the brake drive, receive a velocity measurement value from the velocity sensor;

after the step of instructing the brake power source of the brake drive to supply the test current to the electric brake motor of the brake drive, instruct the wheel motor power source of the electric wheel drive to increase power supplied to the electric wheel motor such that the velocity of the vehicle and/or the angular velocity of the wheel remains equal to the velocity measurement value.

18. The vehicle according to claim 17, wherein the sensor is a power sensor configured to measure the increase in power supplied from the wheel motor power source to the electric wheel motor.

19. The vehicle according to claim 16, wherein:

the vehicle comprises:

a plurality of wheels;

one or more sensors;

the electronic brake system of the vehicle comprises:

a plurality of brake discs, each brake disc being associated with a wheel of the vehicle;

a plurality of brake drives, each brake drive comprising a brake pad and an electric brake motor, wherein the brake power source is configured to drive the electric brake motor of each brake drive, wherein:

the brake pad of each brake drive is arranged to interact with a respective brake disc to generate a brake force as a result of the brake pad of the respective brake drive being pressed by the respective electric brake motor of the respective brake drive against the respective brake disc;

each sensor is configured to measure an effect on the vehicle as a result of the brake force generated by the brake pad of a brake drive pressing against the brake disc of said brake drive;

the controller of the electronic brake system is further configured to:

in the step of generating the test current value and the expected brake effect value, generate a test current value and an expected brake effect value for one or more of the plurality of brake drives, each expected brake effect value being deduced from the test current value based on characteristics of the vehicle;

in the step of instructing the brake power source of the brake drive to supply a test current to the electric brake motor of the brake drive, instruct the brake power source of each of the one or more brake drives to supply a test current to the electric brake motor of the respective brake drive, the magnitude of the test current being equal to a respective test current value;

in the step of receiving the brake effect measurement value from the sensor of the electronic brake system, receive one or more brake effect measurement values, each brake effect measurement value being received from a sensor of the one or more sensors;

in the step of obtaining the diagnostic result, compare each brake effect measurement value of the plurality of brake effect measurement values with a respective expected brake effect value to obtain the diagnostic result.

20. The vehicle according to claim 19, wherein the controller is further configured to:

in the step of generating the test current value and the expected brake effect value, generate two complementary test current values I1 and I2;

in the step of instructing the brake power source of the electronic brake system to supply a test current to the electric brake motor of the electronic brake system, instruct the brake power source to supply a test current equal to the test current value I1 to an electric brake motor of a brake drive associated with a front wheel of the vehicle, and instructing the brake power source to supply a test current equal to the test current value I2 to an electric brake motor of a brake drive associated with a rear wheel of the vehicle.

21. The vehicle according to claim 20, wherein the controller is further configured to:

repeat the steps of generating a test current value and an expected brake effect value, instructing the brake power source of a brake drive to supply a test current to the electric brake motor of the brake drive, receiving a brake effect measurement value from the sensor, and comparing the brake effect measurement value with the expected brake effect value to obtain a diagnostic result at least four times;

in each repetition of the step of instructing the brake power source of the brake drive to supply a test current to the electric brake motor of the brake drive, instruct the brake power source to supply a respective test current value to an electric brake motor of brake drives associated with a different pair of a front wheel and a rear wheel of the vehicle;

in each repetition of the step of receiving the brake effect measurement value from the sensor of the electronic brake system, receiving a single brake effect measurement value representing the brake effect on the vehicle as a result of the combined brake force generated by the interaction of a brake disc of the electronic brake system and a brake pad of a brake drive of the electronic brake system associated with the front wheel and the interaction of a brake disc of the electronic brake system and a brake pad of a brake drive of the electronic brake system associated with the rear wheel;

obtain an aggregated diagnostic result that represents a deduced braking quality of each pair of interacting brake disc of the electronic brake system and brake pad of the brake drive of the electronic brake system.

* * * * *